(12) United States Patent
Rinne et al.

(10) Patent No.: US 8,077,612 B2
(45) Date of Patent: Dec. 13, 2011

(54) APPARATUS, METHOD AND COMPUTER PROGRAM PRODUCT TO CONFIGURE A RADIO LINK PROTOCOL FOR INTERNET PROTOCOL FLOW

(75) Inventors: Mika P. Rinne, Espoo (FI); Jean-Philippe Kermoal, Veikkola (FI)

(73) Assignee: Nokia Corporation, Espoo (FI)

( * ) Notice: Subject to any disclaimer, the term of this patent is extended or adjusted under 35 U.S.C. 154(b) by 1225 days.

(21) Appl. No.: 11/509,502

(22) Filed: Aug. 23, 2006

(65) Prior Publication Data

US 2007/0064608 A1    Mar. 22, 2007

Related U.S. Application Data

(60) Provisional application No. 60/711,276, filed on Aug. 24, 2005, provisional application No. 60/715,765, filed on Sep. 9, 2005.

(51) Int. Cl.
*H04L 12/26* (2006.01)
(52) U.S. Cl. .................................... 370/230; 370/252
(58) Field of Classification Search .................. 370/230, 370/252–255, 278, 282, 400, 401
See application file for complete search history.

(56) References Cited

U.S. PATENT DOCUMENTS

| | | | |
|---|---|---|---|
| 6,792,277 B2 * | 9/2004 | Rajaniemi et al. | 455/456.1 |
| 7,020,143 B2 * | 3/2006 | Zdan | 370/395.21 |
| 7,072,655 B2 * | 7/2006 | Ikeda et al. | 455/436 |
| 7,120,443 B2 * | 10/2006 | Malladi et al. | 455/450 |
| 7,230,937 B2 * | 6/2007 | Chi et al. | 370/329 |
| 7,369,492 B2 * | 5/2008 | Shimizu | 370/230 |
| 2003/0125069 A1 * | 7/2003 | Lee | 455/522 |
| 2005/0163074 A1 * | 7/2005 | Mella et al. | 370/329 |
| 2006/0164978 A1 * | 7/2006 | Werner et al. | 370/229 |
| 2006/0239265 A1 * | 10/2006 | Son et al. | 370/390 |
| 2006/0246900 A1 * | 11/2006 | Zheng | 455/435.3 |
| 2006/0276181 A1 * | 12/2006 | Malladi et al. | 455/412.2 |

FOREIGN PATENT DOCUMENTS

| | | |
|---|---|---|
| EP | 0 642 283 A2 | 3/1995 |
| EP | 1 217 854 A1 | 6/2002 |
| WO | WO 99/39528 | 8/1999 |
| WO | WO-2006/010986 A1 | 2/2006 |
| WO | WO 2006/104946 A1 | 10/2006 |

* cited by examiner

*Primary Examiner* — Hong Cho
(74) *Attorney, Agent, or Firm* — Harrington & Smith

(57) ABSTRACT

A radio link service profile is defined as a set of parameters for upper layer transport of an IP packet, and may be associated with a logical channel flow identifier. A data packet is sent over a wireless logical channel that is identified by the LCID between a base station and a user equipment. The association of RLSP, whether created or invoked form a memory, is coordinated among the BS and the UE without the need to involve the radio network controller, and if the RLSP does not have a diffserv field on the uplink, the BS adds it prior to forwarding the data packet. A method, device (both BS and UE), computer program product, and system are described in multiple embodiments.

43 Claims, 27 Drawing Sheets

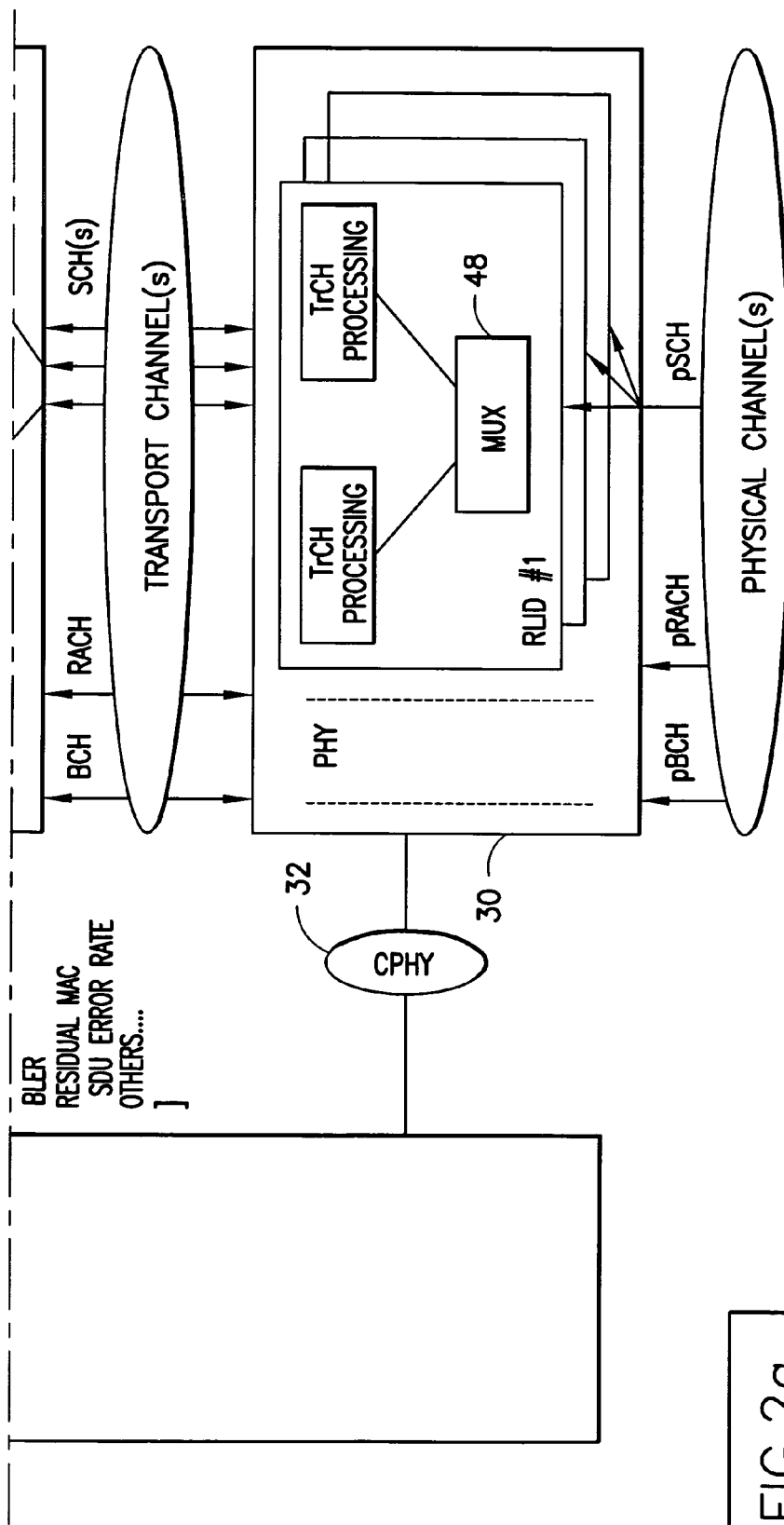

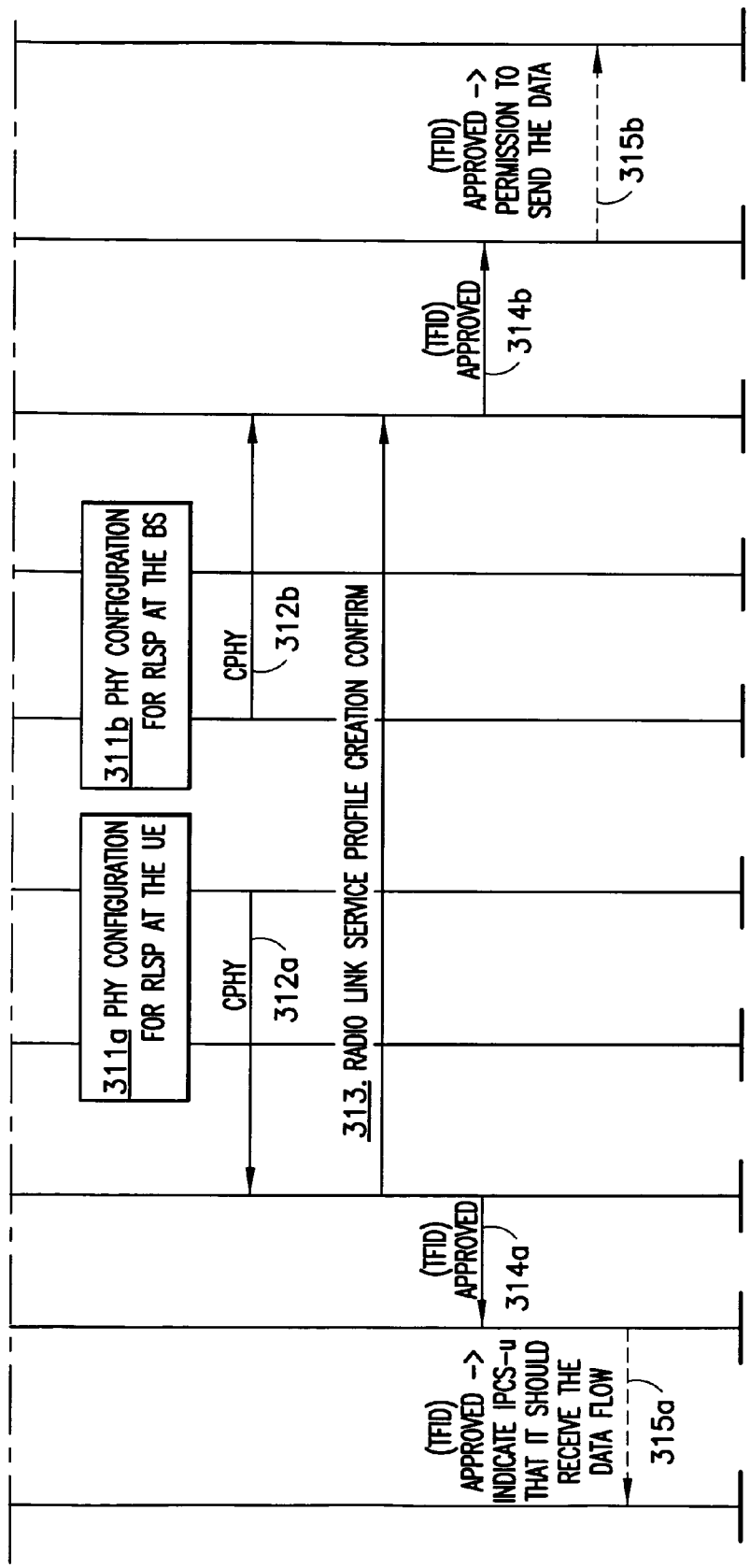

| INFORMATION ELEMENT GROUP NAME | NEED | MULTI | TYPE AND REFERENCE | SEMANTICS DESCRIPTION |
|---|---|---|---|---|
| MESSAGE TYPE | MP | | MESSAGE TYPE | |
| BS INFORMATION ELEMENTS | | | | |
| RRC TRANSACTION IDENTIFIER | MP | | | |
| LLSID ~ 62 | MP | | | IDENTIFIER OF THE FULL SERVICE PROFILE |
| TFID ~ 22 | MP | | | TFID OF THE FLOW WHICH IS ASSIGNED TO THIS LINK LAYER SERVICE PROFILE |
| MACmode | | | | |
| >ACKNOWLEDGE / NON-ACKNOWLEDGE | MP | | BOOLEAN | |
| >IN-ORDER DELIVERY / OUT-OF-ORDER DELIVERY | MP | | BOOLEAN | |

FIG.6A

| FIG.6A |
|---|
| FIG.6B |

FIG.6

| LIST OF LOGICAL CHANNEL FLOW | | <1 TO MAX> | LIST OF THE LOGICAL CHANNEL FLOWS DEFINED FOR THIS SERVICE PROFILE |
|---|---|---|---|
| >DiffServ ~ 59 | OP | | DiffServ OF THE FLOW WHICH IS ASSIGNED TO THIS LOGICAL CHANNEL FLOW |
| >LC ID ~ 38 | OP | INTEGER | |
| >DELAY ~ 60a | | | |
| >>NOMINAL | OP | INTEGER | |
| >>MAX | OP | INTEGER | |
| >BIT RATE ~ 60b | | | |
| >GUARANTEED MINIMUM VALUE | OP | INTEGER | |
| >EXPECTED VALUE | OP | INTEGER | |
| >BLER ~ 60c | | | |
| >>TARGET BLER | OP | INTEGER | |
| >>RESIDUAL MAC SDU ERROR RATE ~ 60d | | | |
| >>MAX | OP | INTEGER | |
| OTHER... | | | |

FIG.6B

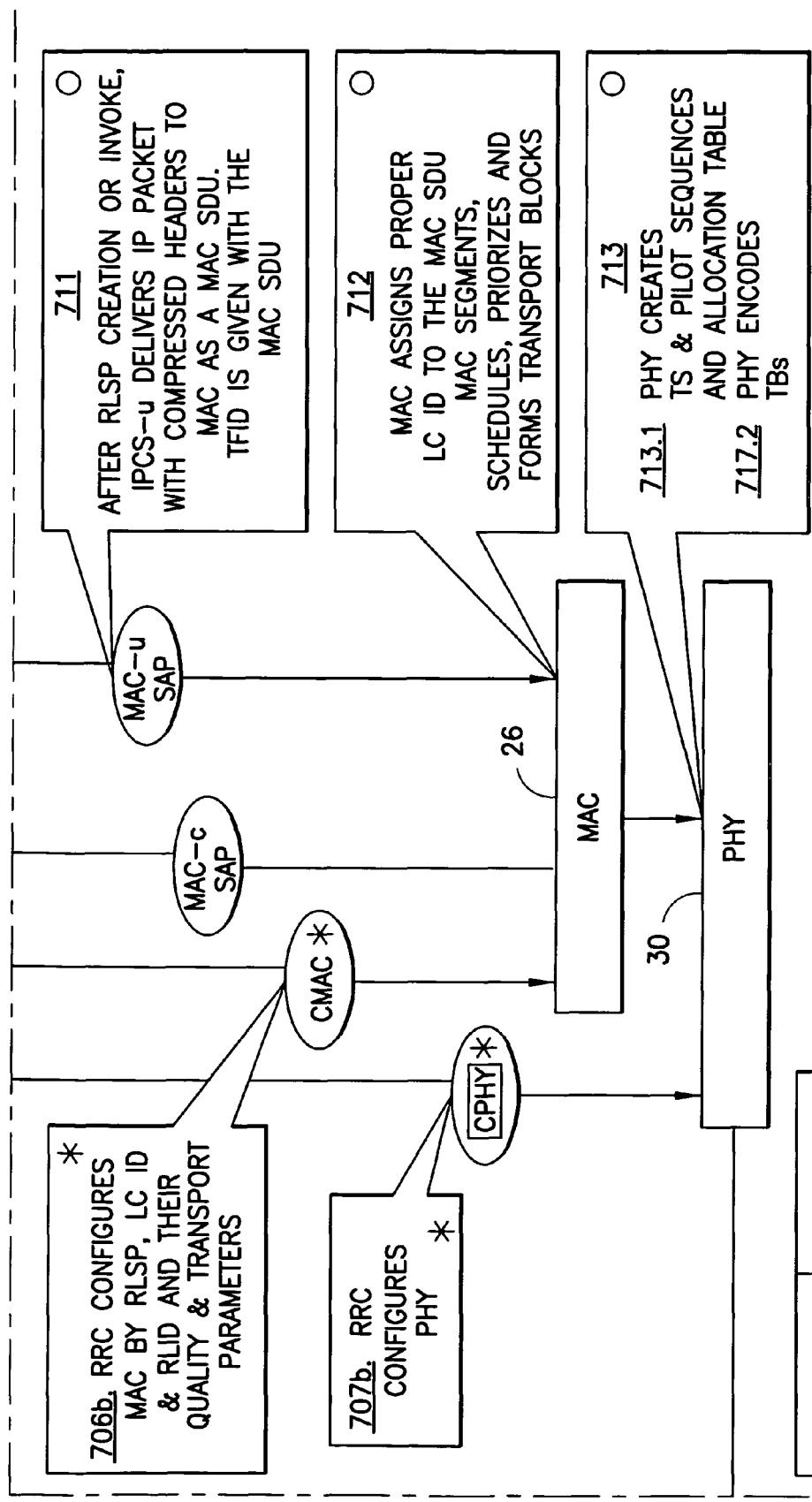

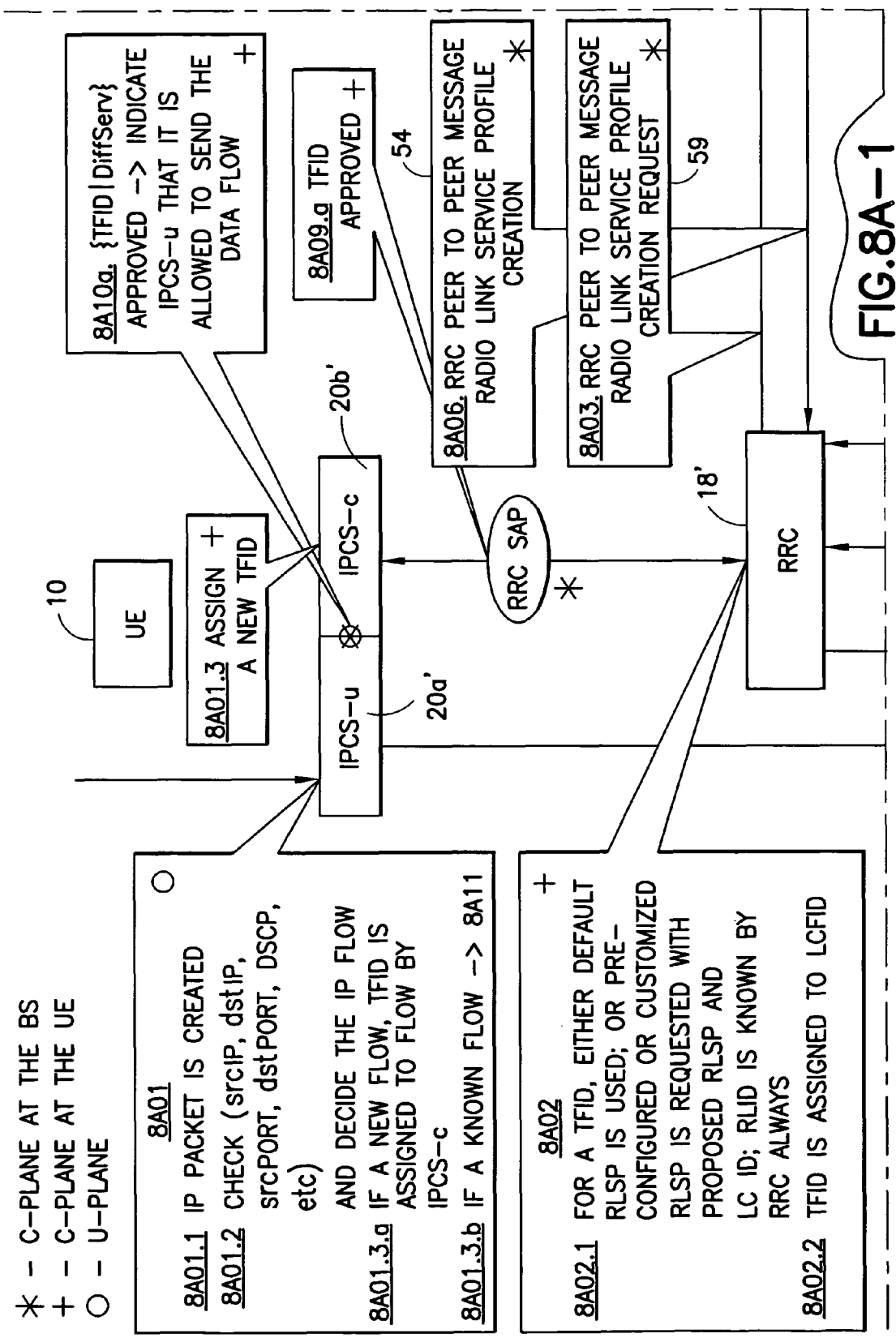

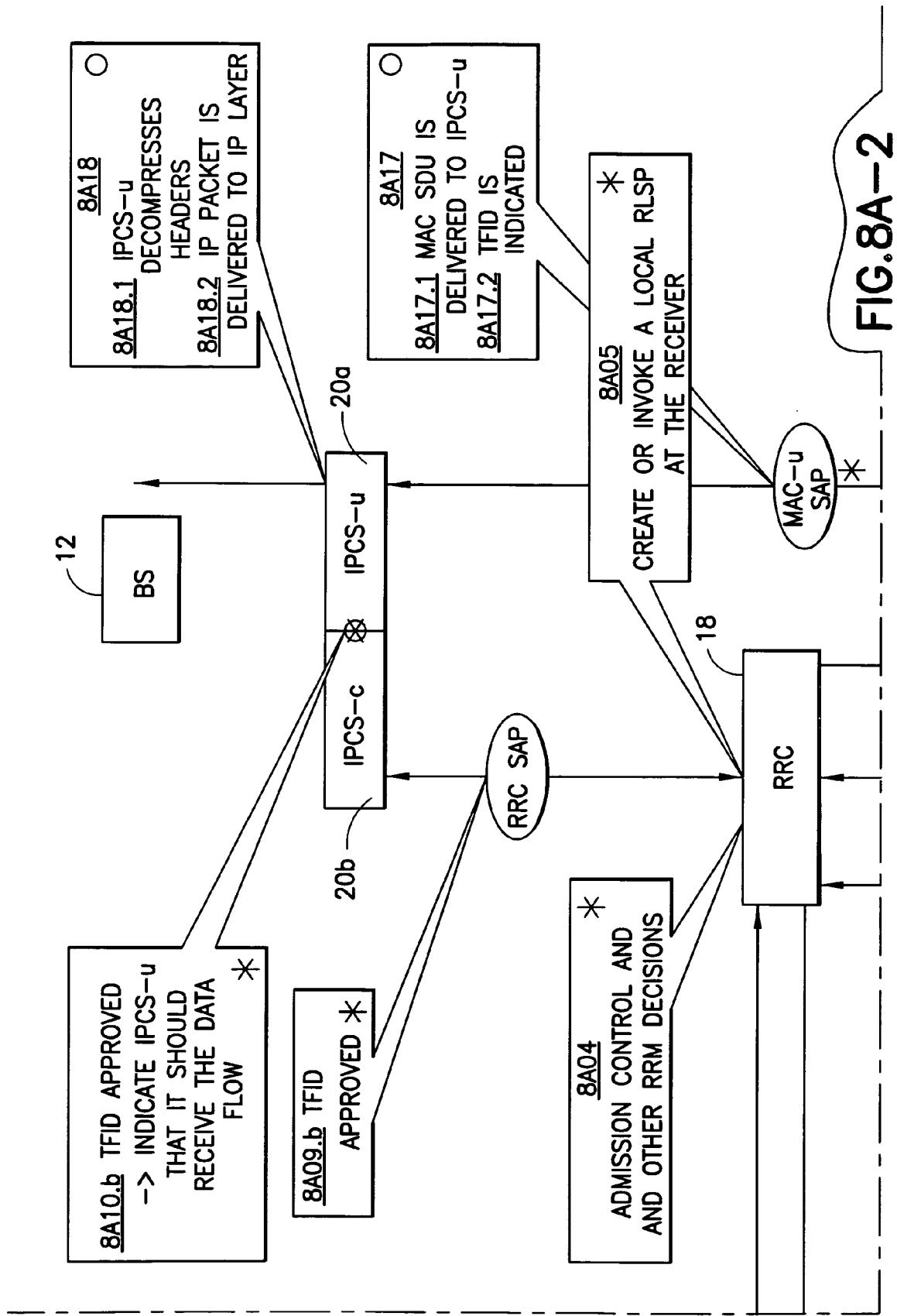

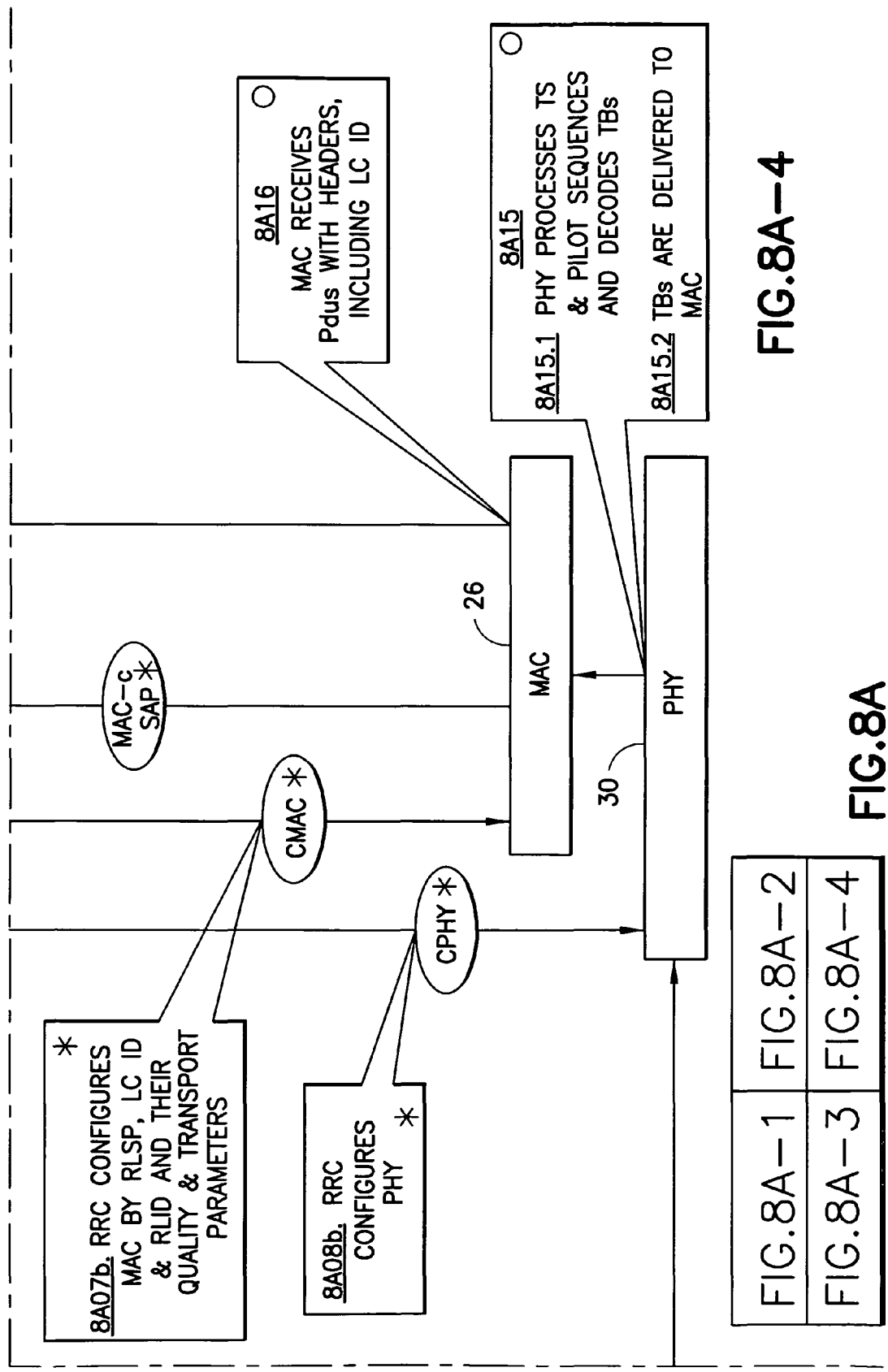

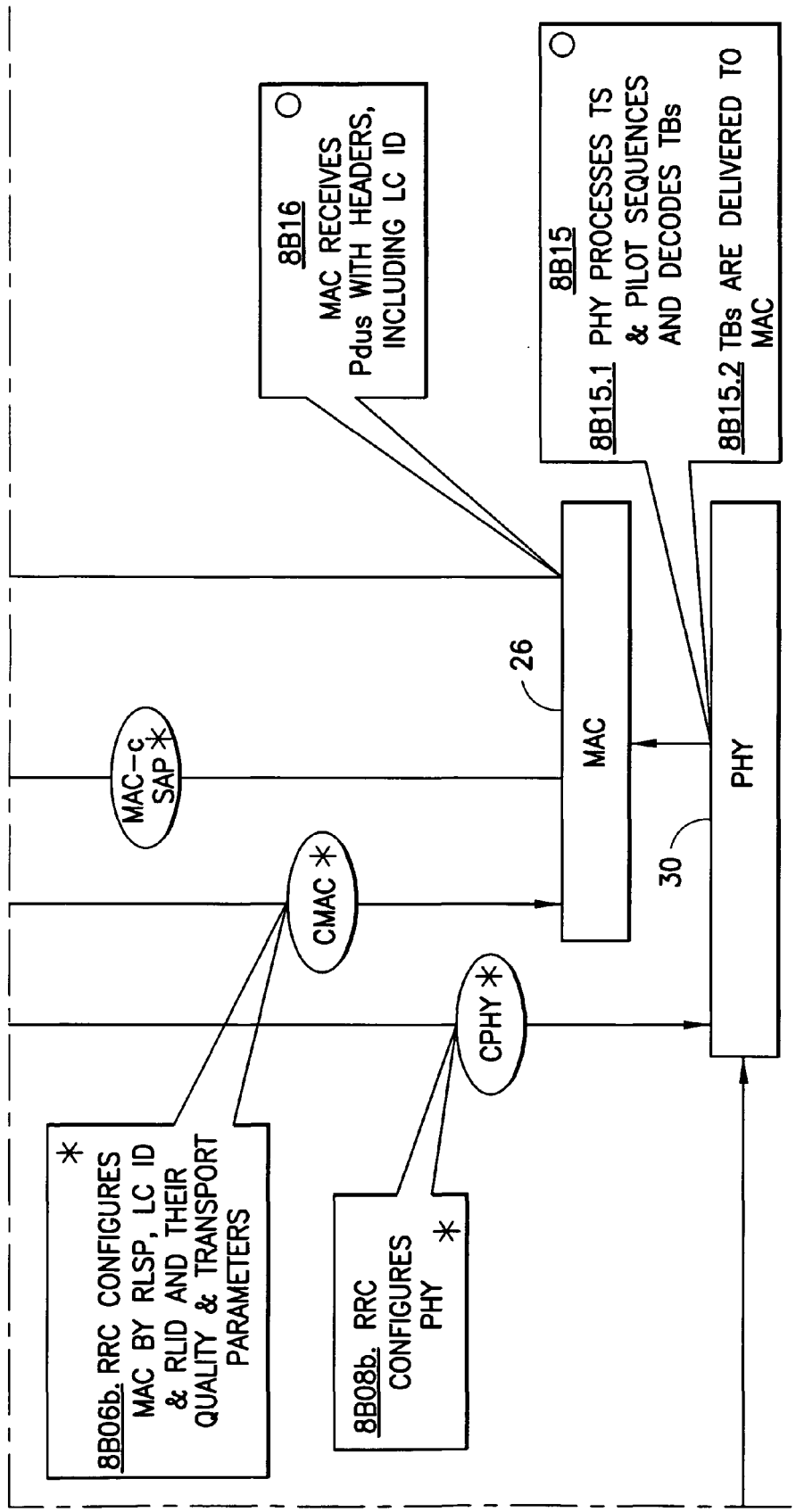

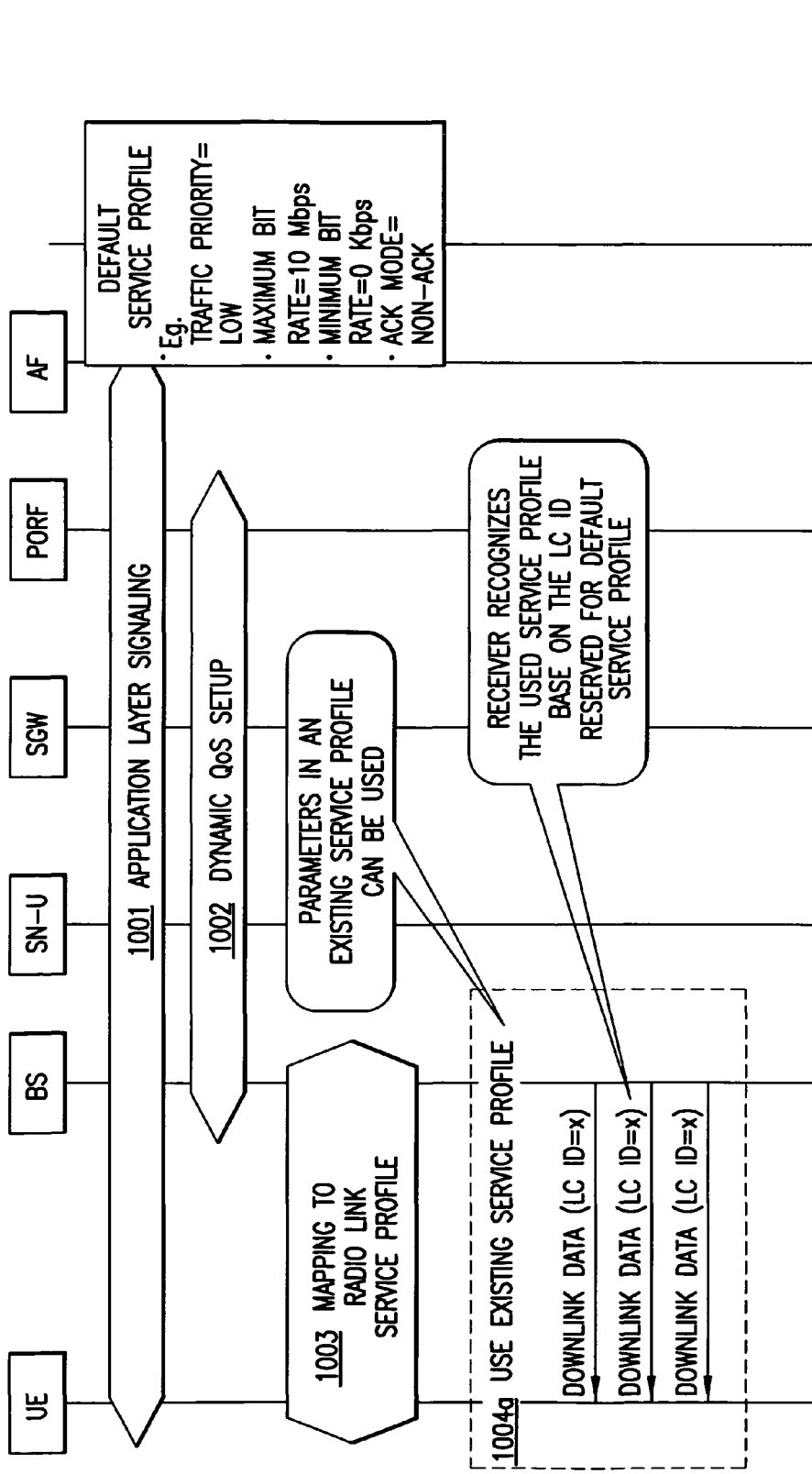

APPARATUS, METHOD AND COMPUTER PROGRAM PRODUCT TO CONFIGURE A RADIO LINK PROTOCOL FOR INTERNET PROTOCOL FLOW

CROSS-REFERENCE TO RELATED APPLICATIONS

This application claims priority to U.S. Provisional Application Ser. Nos. 60/711,276 (filed Aug. 24, 2005) and 60/715,765 (filed Sep. 9, 2005), both of which are incorporated by reference.

TECHNICAL FIELD

The exemplary and non-limiting embodiments of this invention relate generally to wireless communications systems, methods, device and computer program products and, more specifically, relate to the use of the internet protocol (IP) over a wireless link between two system elements.

BACKGROUND

In the conventional UTRAN/GERAN system implementations the concept of a radio bearer is needed to setup a connection between the radio network controller RNC and the user equipment UE. However, the radio bearer configuration process requires considerable signaling to negotiate the transport quality and bearer parameters. In practice, the bearer structure is hierarchical between several network entities since the UMTS bearer, radio access bearer and transport bearers (i.e. Iu bearer) are needed, in addition to the radio bearers to carry a flow over the radio access network RAN.

This type of a bearer structure adds delay in the flow set-up, and is difficult to update or reconfigure dynamically.

As it is expected that wireless IP traffic will become even more dominant in the future, new requirements for set-up delay, bit rates and dynamic adjustability will be needed for the radio access technologies. However, the current radio bearer concept will not meet these requirements the most efficiently.

It can be noted that an attempt has been made to enhance the bearer concept to become more packet oriented and flexible, as described in 3GPP 25.331, version 6.x. Further, some newer radio systems, other than 3G UTRAN/GERAN, have means to operate without bearers, because of their ad hoc networking nature and the use of random access channel reservations. However, their quality of service mechanisms typically are not as sophisticated as those of 3G UTRAN/GERAN.

SUMMARY

In accordance with an exemplary embodiment is a method for sending a packet between a base station BS and a user equipment UE. In the method, a temporary flow is associated with a radio link service profile RLSP, where the RLSP includes at least one of a set of quality parameters, a set of transport parameters or a logical channel identifier LCID. The RLSP is available for the upper layer packet transport. Further in the method, a data packet is sent over a wireless logical channel that is identified by the LCID.

In accordance with yet another exemplary embodiment is a device that includes a processor coupled to a memory and to a transceiver. The memory is for storing computer program instructions to associate a temporary flow with a radio link service profile RLSP, where the RLSP includes at least one of a set of quality parameters, a set of transport parameters or a logical channel identifier LCID for upper layer packet transport. The transceiver sends a data packet over a wireless logical channel identified by the LCID after the computer program instructions make the association.

In accordance with another exemplary embodiment is a computer program product, embodied on a computer readable storage medium of a base station BS or a user equipment UE, that includes instructions to cause a digital processor to perform actions directed toward stipulating upper layer transport conditions for a data packet. The actions include associating a temporary flow with a radio link service profile RLSP. The RLSP includes at least one of a set of quality parameters, a set of transport parameters or a logical channel identifier LCID, and is for upper layer packet transport. The actions also include sending a data packet over a wireless logical channel identified by the LCID.

In accordance with yet another exemplary embodiment is a system that includes a base station BS and a user equipment UE. Each of the BS and the UE include a processor coupled to a transceiver and to a memory. The memory of each is for storing computer program instructions. The system operates to coordinate upper layer signaling for a data packet by exchanging messages between the BS and UE so as to associate a temporary flow with a radio link service profile RLSP. The RLSP includes at least one of a set of quality parameters, a set of transport parameters or a logical channel identifier LCID. Further, the system sends a data packet over a wireless logical channel identified by the LCID between the BS and the UE.

These and other aspects are detailed more particularly below.

BRIEF DESCRIPTION OF THE DRAWINGS

In the attached Drawing Figures:

FIG. 6 illustrates a non-limiting example of a message for RRC creation, as well as the constituent information elements of the RLSP CREATION message.

DETAILED DESCRIPTION

Figure 1A:
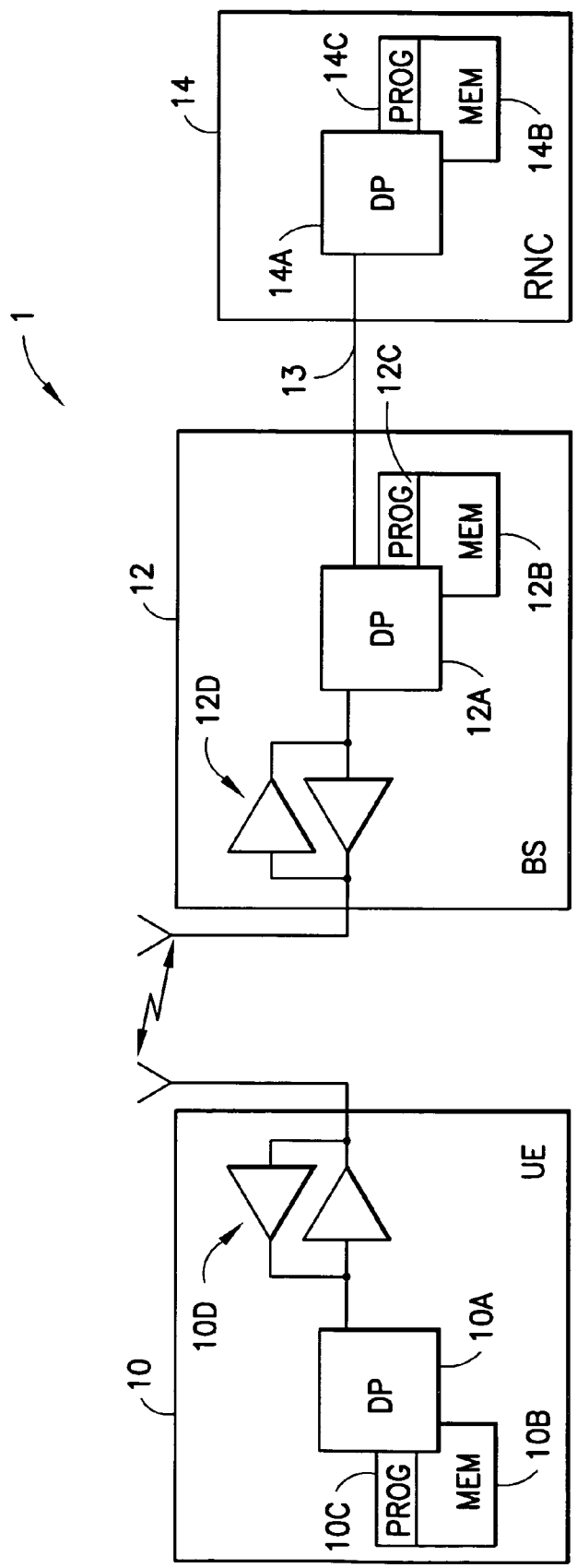
FIG. 1A shows a simplified block diagram of various electronic devices that are suitable for use in practicing the exemplary embodiments of this invention in a GERAN/UTRAN network architecture.

The following abbreviations are defined as follows:
3GPP: Third Generation Partnership Project
BS: base station
CTCH: common traffic channel (a logical channel type)
DCCH: dedicated control channel (a logical channel type)
DiffServ: Differentiated service (service flow differentiation present in a field of every IP packet)
DL downlink, BS to UE communication link
DSCP: Differentiated Services Code Point (a code given for a differentiated service flow in a network node)
DTCH: dedicated traffic channel (a logical channel type)
E-UTRAN: Evolved UTRAN
GERAN: GSM/EDGE Radio Access Network
IP: internet protocol
IPCS: IP Convergence Sub-layer
LCID: Logical Channel identity allows a logical channel to be divided into one or more logical channel flows. Each logical channel flow is uniquely identified by the LCID.
MAC-u/c: medium access control protocol (user/control plane)
MBMS multimedia broadcast multicast simulcast
MTCH: multimedia traffic channel (a logical channel type)
PDU: protocol data unit (protocol unit of the active layer)
PHY: physical layer
RAN radio access network
RLID: radio link identity (RLID) is a unique identity of the radio link of a UE in a given cell. RLID is given by RRC. RLID changes, when serving cell is changing.
RLSP: Radio Link Service Profile. In accordance with exemplary embodiments of this invention, a RLSP is defined for an upper layer flow by the RRC. The RLSP contains a unique profile identity per UE with at least one of a set of quality, a set of transport parameters or a LCID. These quality and transport parameters are to be satisfied over the MAC-u SAP peer entities. The RLSP replaces the UTRAN radio bearer concept in order to satisfy the C-plane and U-plane low latency requirements set for E-UTRAN. Thus, RLSP may also be called as Radio Bearer Service Profile or such.
RLSP identity: a unique reference number for a RLSP
RRC: radio resource control
SAP: service access point (a local protocol interface)
SDU: service data unit (a higher layer Protocol Unit, e.g. a single IP packet)
TCP: transmission control protocol (above IP)
TFID: traffic flow identity (TFID) is a unique identifier of an upper layer packet flow at the IPCS-u. TFID is a defined combination of IP Source Address, IP Destination Address, Source Port, Destination Port and DiffServ field (and possibly other attributes). TFID is given by IPCS.
UDP: user datagram protocol (above IP)
UE: user equipment
UL uplink, UE to BS communication link
UMTS: universal mobile telecommunication system
UTRAN: universal terrestrial radio access network The exemplary embodiments of this invention provide solutions to operate with quality of service classes of IP traffic over the air interface at low delay with easy and fast configurability of relevant parameters.

The non-limiting embodiments of this invention are related at least in part to the E-UTRAN. E-UTRAN provides a new protocol architecture to efficiently serve traffic fully in the packet-switched (PS) domain. The IP protocol is used for transport in the RAN, as well as over the air interface.

This protocol structure avoids conventional bearer negotiation between several network elements and RRC may fully be configured in the BS. In the BS, the IP flows are available to an IPCS, which allows a user plane traffic flow to interact with the MAC. This interaction may be local or may happen via a packet transport network to a routing node without limitations of the invention.

The non-limiting embodiments of this invention are further related, at least in part, to the creation (and deletion) of a RLSP. The RLSP is configured by the RRC protocol and allows an IP flow to utilize MAC and PHY protocol services efficiently and flexibly. RLPS is a term coined herein and includes the L2 QoS parameters that determine how an IP packet is handled at the radio link layer (both in the transmitter and in the receiver). Three types of RLSPs are described: default, pre-configured, and customized.

From an architectural point of view of the invention, it is notable that the protocols and protocol entities communicate according to the exemplary embodiments of the invention. It is of secondary importance, for the invention, if in a given architecture, such as 3G UTRAN/GERAN, the RRC protocol is executed in the RNC, as a non-limiting example. In the new architecture, such as E-UTRAN or an ad hoc network, the RRC protocol may be executed in the BS, as a non-limiting example. These architectural renewals may provide reduced delays and increased efficiency for the packet traffic. A similar architectural issue is the location of the PDCP protocol. Its functionality, from the inventive sense, is not different, whether it is located in the RNC, as in 3G UTRAN/GERAN architecture, or in a routing node, as in E-UTRAN architecture, or in a BS in an ad hoc networking solution, as non-limiting examples. Furthermore, the PDCP-c (control plane) and PDCP-u (user plane) protocols may be split to different network nodes, as non-limiting examples.

Reference is made first to FIG. 1A for illustrating a simplified block diagram of various electronic devices that are suitable for use in practicing the exemplary embodiments of this invention. In FIG. 1A a wireless network 1 includes a UE 10, a base station (BS) 12 and a RNC 14. The UE 10 includes a data processor (DP) 10A, a memory (MEM) 10B that stores a program (PROG) 10C, and a suitable radio frequency (RF) transceiver 10D for bidirectional wireless communications with the BS 12, which also includes a DP 12A, a MEM 12B that stores a PROG 12C, and a suitable RF transceiver 12D. The BS 12 is coupled via a data path 13 to the RNC 14 that also includes a DP 14A and a MEM 14B storing an associated PROG 14C. At least the PROGs 10C and 12C are assumed to include program instructions that, when executed by the associated DP, enable the electronic device to operate in accordance with the exemplary embodiments of this invention, as will be discussed below in greater detail.

Figure 1B:
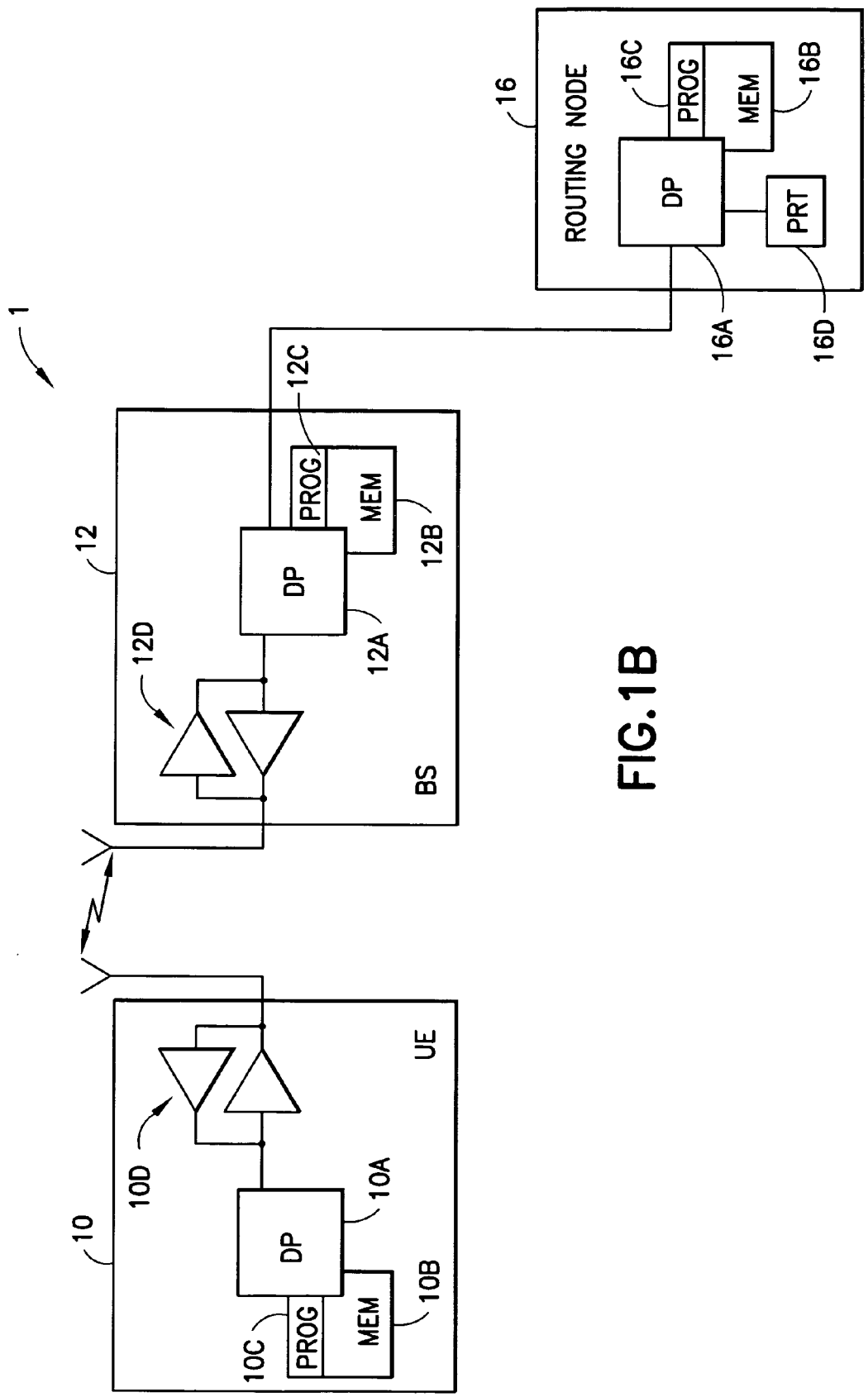
FIG. 1B shows a simplified block diagram of various electronic devices that are suitable for use in practicing the exemplary embodiments of this invention in an Evolved-UTRAN network architecture.
Figure 2A:
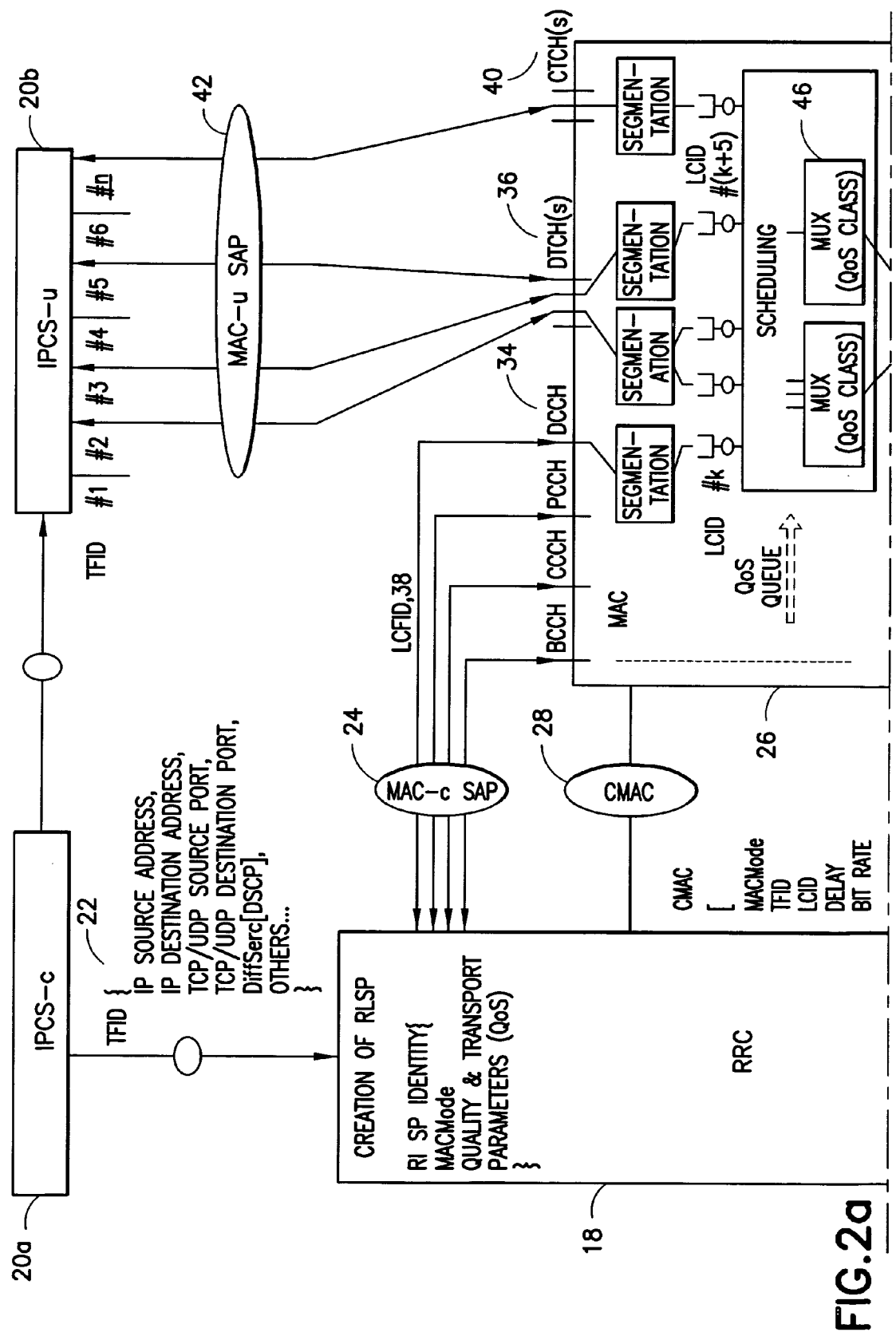
FIG. 2 illustrates protocol stack that embodies service profiles and a flow diagram according to one exemplary embodiment.

It should be noted that exemplary embodiments of this invention may also be employed in a new network architecture (e.g., E-UTRAN), where the functionality is solely between the BS 12 and the UE 10, where the BS 12 has a networking connection to the E-UTRAN and further to the core network. As can be seen in the exemplary wireless network 1' of FIG. 1B, the BS 12 is not coupled via a data path to the RNC 14, as shown in the example of FIG. 1A, but instead is coupled by a packet transport protocol to a routing node 16 in a packet network. In this case the routing node 16 may be assumed to include a data processor (DP) 16A, a memory (MEM) 16B that stores a program (PROG) 16C and an IP packet routing table (PRT) 16D, where the PROG 16C is provided so as to implement the routing node 16 aspects of this invention. The exemplary embodiments of this invention may also be used to advantage with WLAN and Ad Hoc network architectures, as two non-limiting examples. Thus, it should be apparent that the use of the exemplary embodiments of this invention does not require the presence of the RNC 14 of FIG. 1A In general, the various embodiments of the UE 10 can include, but are not limited to, cellular phones, cellular communicators, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities Internet appliances permitting wireless Internet access and browsing, as well as portable units or terminals that incorporate combinations of such functions.

The embodiments of this invention may be implemented by computer software executable by the DP 10A of the UE 10 and the other DPs, or by hardware, or by a combination of software and hardware.

The MEMs 10B, 12B, 14B and 16B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A, 14A and 16A may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention provide a cellular and wireless communication system, without radio bearers, capable of operation fully in the packet-switched domain.

The RLSP is provided for an upper layer IP flow. The RLSP configures the MAC and PHY by setting quality parameters and transport parameters for radio transmission in the user plane.

The exemplary embodiments of this invention encompass a means to configure a RLSP locally in the UE and locally in the BS for both for UE-originated and BS-originated traffic.

Additionally, the exemplary embodiments of this invention provide novel peer-to-peer signaling to invoke a pre-configured RLSP, or to create a customized RLSP in a dynamic manner.

A RLSP includes a unique profile identity per UE having a set of quality parameters and/or transport parameters. A RLSP is characterized in that it is assigned per flow, and is fully sufficient to represent any IP traffic over the radio link. This is an important feature of the RLSP, as the IP does not include radio mobility or radio resource control features.

The exemplary embodiments of this invention pertain to:
 creation of an RLSP;
 assignment of an RLSP to an IP flow;
 signaling to invoke or to create a RLSP peer-to-peer.

Creation of RLSPs

Figures 1, 3A:
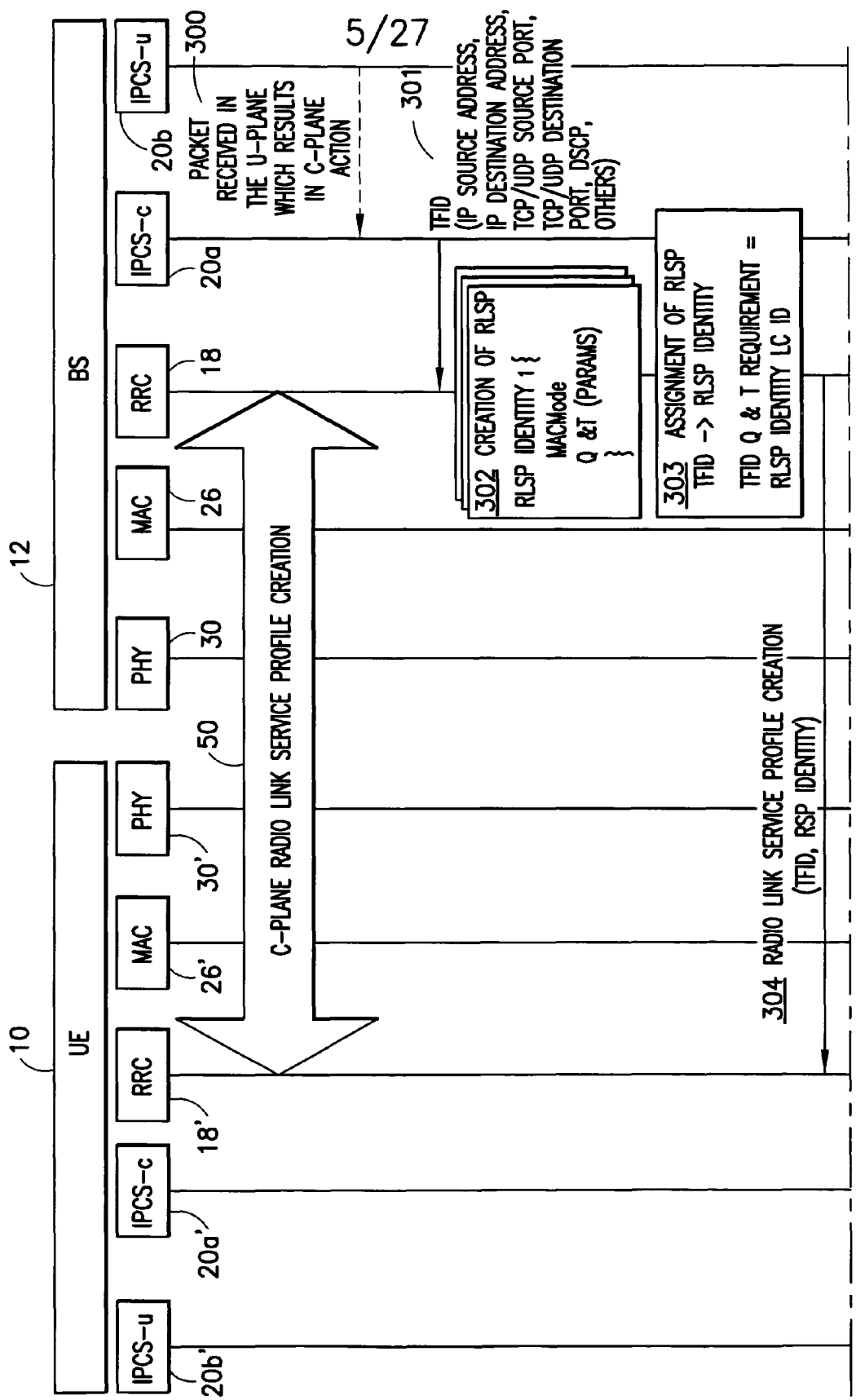
FIG. 3A illustrates peer-to-peer messaging during creation of a radio link service profile for the C-plane in a GERAN/UTRAN network or equally in an Evolved UTRAN (E-UTRAN) network according to one exemplary embodiment.
Figures 2, 3A:
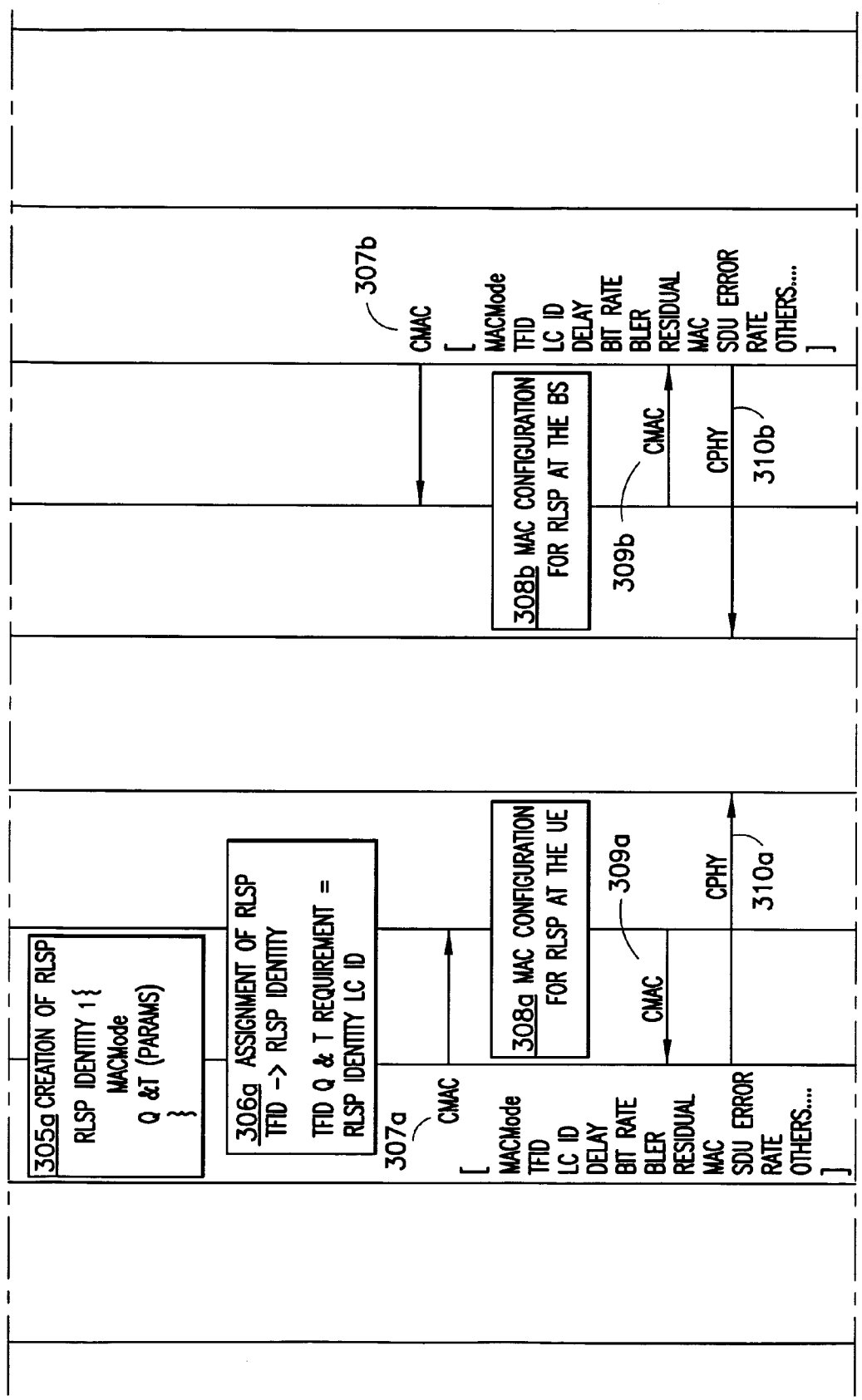

Referring to FIG. 2, the RRC 18 (configured in the BS 12) can, on request from upper layers (through the IPCS), create a RLSP. At creation, the RRC 18 performs admission control and selects parameters for the RLSP, based on information from upper layers. These upper layers may include Session Initiation or Session Description protocols.

The upper layer protocol provides desired quality requirements to the IPCS 20a, 20b, as differentiated services (DiffServ). The IPCS 20a denotes a flow in its preferred way and assigns a TFID 22 to every flow.

A flow may be defined to be, as a non-limiting example, a combination of IP Source Address, IP Destination Address, Source Port (TCP or UDP port) and Destination Port (TCP or UDP port).

The IPCS 20a, 20b delivers the TFIDs 22 and quality requirements of the flow (based on DiffServ) to the RRC 18 in the control plane (C-plane) via the RRC SAP 42, 44. Thus, the RRC 18 can configure and control the MAC 26 via CMAC 28, and PHY 30 via CPHY 32 interfaces, for transport in the user plane (U-plane). FIG. 2 shows an example of a protocol stack for use with the RLSP, and a flow diagram.

The RLSP can be:
 a default RLSP
   default for the C-plane, DCCH 34.
   default for the U-plane, DTCH 36.
 a pre-configured RLSP; or
 a customized RLSP.

Briefly, a RLSP can be created locally and communicated peer-to-peer. The RLSP may be considered to be primarily local. At a minimum, a RLSP is default (a-priori known), which is fully local. In a typical case, the RLSP is pre-configured, in which case peer-to-peer signaling is employed to link a flow (TFID 22) and a profile (RLSP). For a flow that carries differentiated services, a RLSP with multiple logical channel flows (LCID 38) may be defined, such that one logical channel flow serves exactly one differentiated service.

Default RLSP: The default RLSP is always reserved for the C-plane DCCH 34. For the U-plane DTCH 36 or CTCH 40, there is also a default RLSP defined for each logical channel type. It can be noted that the CTCH 40 may be replaced by a MTCH, which is the logical channel for MBMS.

The RLSP default for the DTCH 36 may be used primarily for: a) connection request/confirm packets; b) session initiation traffic; c) or other IP control packets (U-plane traffic). It may also be used for application flows (for example, short message service and e-mail).

One benefit of the default RLSP is that it exists in the UE 10 and in the BS 12, both in the idle and in the active state, and is readily available for use. Thus, a default RLSP is characterized in that it does not require invocation by a RRC procedure.

Pre-configured RLSP: The pre-configured RLSP is defined locally. Any number of pre-configured RLSPs may exist, but they preferably all have a unique reserved identity. A pre-configured RLSP is characterized in that it is implicitly defined, e.g. by a standard specification, and thus it is available locally in the UE 10 and in the BS 12, where it can be invoked by a RRC procedure. The invoke procedure may include a small message that contains the number reference (identity) of the pre-configured RLSP. Alternatively, pre-configuration of the RLSP may occur in a network-specific way instead of being defined by a standard. In the network-configured case, the UE 10 may load the pre-configured RLSP(s) before the actual use, e.g., during Initial Access to, or Registration with the network.

Customized RLSP(s): The customized RLSP is defined locally at the originating entity (UE 10 or BS 12) and its creation is communicated peer-to-peer at the instance of use. The RRC may allocate any free identity to the customized RLSP, which is neither default nor pre-configured. The customized RLSP is characterized in that it contains:

```
RLSP identity{
    MACmode =    {
                 Acknowledge / Non-Acknowledge,
                 In-order delivery / out-of-order delivery,
                 }
    Traffic priority {
                 Low,
                 medium,
                 high}
    Delay        {
                 nominal,
                 max.
                 }
    Bit rate     {
                 Guaranteed minimum value,
                 Expected value.
                 }
    BLER         {
                 Target BLER.
                 }
    Residual MAC SDU error rate    {
                                   Max.
                                   }
    others....
    }
```

By the use of the exemplary embodiments of this invention every IP flow is uniquely assigned to a single RLSP. If the IP flow is defined to support differentiated services (DiffServ) by the means of its Diffserv field in the IP header, then each such differentiation is assigned to a unique logical channel flow (LCID 38) of the assigned RLSP.

It is possible to assign a single RLSP to more than one TFID 22 consequently, after the previous flow assignment is terminated. It is also possible to assign a single RLSP to more than one TFID 22 simultaneously, if the TFIDs 22 are of different radio links (such as a different UE 10 served by the BS 12). As a further extension of the invention, it is possible to assign a single RLSP to more than one TFID 22 of a single UE 10 simultaneously, so long as its logical channel types or logical channel numbers differentiate them uniquely.

Discussed now is the usage of the RLSP in the IP flow in the context of MAC SDU delivery. By the use of the exemplary embodiments of this invention, as LCID 38 is applied for transport of SDU reception at the MAC-u SAP 42 of U-plane logical channel (TCH 36, 40), or at the MAC-c SAP 44 of C-plane logical channel (DCCH 34), a particular LCID 38 is applied depending on DiffServ attributes of the SDU. SDUs from each logical channel flow (LCID 38) are segmented and multiplexed to MAC PDUs. Thus, a single Transport Block is defined as a packing of one or several MAC segments having the same LCID 38.

The use of the invention allows any multiplexing of logical channel flows 46 in the MAC 26. For example, different logical channels may be multiplexed together and transported by one RLSP and one LCID 38, if otherwise practical. Or alternatively, a single logical channel may be split into different logical flows that are transported by mutually different RLSP and LCID 38. The description of the exemplary embodiments of the invention above omits MAC multiplexing 46, as the described mode is assumed to be most efficient in terms of processing power and delay. It can be noted that multiplexing occurs in any case at the Transport Channel level 48.

Reference is made to FIG. 3A for illustrating the creation of a RLSP per radio link for the C-plane 50. It should be noted, however, that the use of the exemplary embodiments of this invention is not restricted to either the UL or the DL. The invention is illustrated for DL as well as for UL originated IP flows. The numbered message flows are described as follows.

At step 300, a packet is received in the U-plane which results in action in the C-plane, such as a packet sent from the UE 10 to the BS 12 that is not a peer-to-peer packet. At step 301, the TFID 22 presents an IP flow by means of a combination of parameters present in the IP headers of that packet (e.g., combination of IP Source Address, IP Destination Address, Source Port, Destination Port, DSCP and possibly others). At step 302, the RRC 18 creates a RLSP and defines a set of radio link parameters and identifiers (RLSP identity for C-plane and LCID 38 for U-plane). The RRC 18 generates parameters locally that describe the radio link quality and transport requirements for this combination of RLSP and LCID 38 per user. At step 303, the RRC 18 assigns uniquely an upper layer flow (TFID 22) to a RLSP, known by the combination of RLSP in the C-plane and LCID 38 in the U-plane. At step 304, the RRC 18 signals relevant information elements of the full service profile to its peer entity (e.g., the RRC 18' of the UE 10). At step 305, the peer RRC entity 18' creates a local copy of the RLSP (step 305*a*) and assigns it (step 306*a*), respectively. At step 306, the RRC 18' in the UE 10 and in the BS 12 (18) locally configure MAC 26, 26' and PHY 30, 30' by the specified set of radio link service parameters at steps 307*a* and 307*b*. By this means, the RLSP and LCID 38 are available for MAC 26, 26' and PHY 30, 30' as a reference to be used in the control plane (RLSP) and user plane (LCID 38), respectively. At step 308*a* and 308*b*, the RLSP is confirmed by the RRC 18', 18. Thus, an IP flow is fully represented by these defined local settings only. This is seen in steps 309*a*, 309*b* where the MAC 26', 26 signals to the RRC 18', 18; so that the PHY 30', 30 is configured at steps 311*a* and 311*b*; and signaling from the PHY 30', 30 to the RRC 18', 18 at steps 312*a*, 312*b*. A RLSP confirmation message is sent from the UE's RRC 18' to its peer 18 in the BS 12, and the TFID 22 is approved at steps 314-315 a and b in both the UE 10 and BS 12 in the C-plane and the U-plane.

Figure 3B:
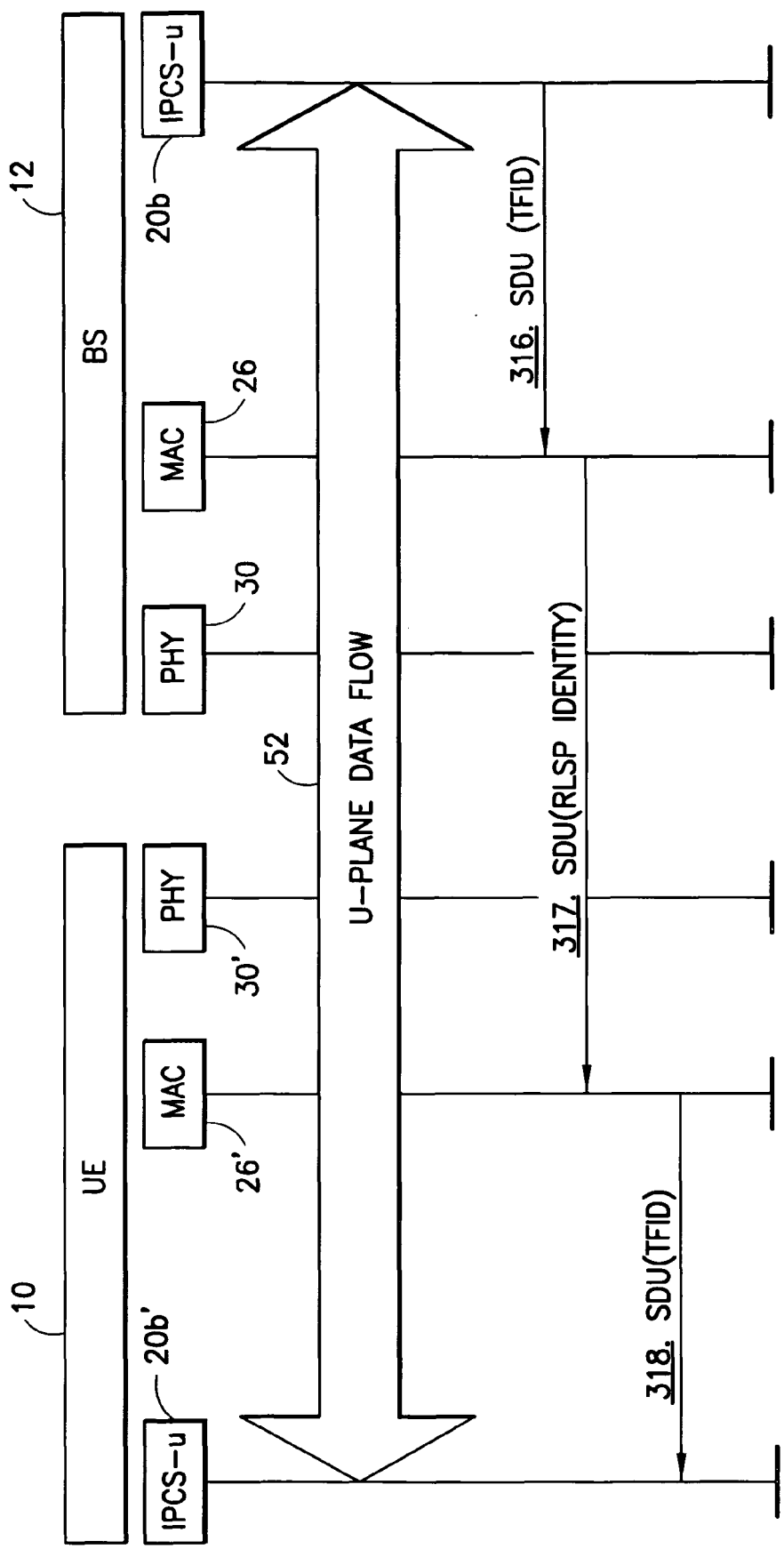
FIG. 3B illustrates the data flow on the U-plane after the radio link service invoke for a GERAN/UTRAN network or equally in an E-UTRAN network according to one exemplary embodiment.

The usage of the RLSP can be characterized as follows, with reference to FIG. 3B, for the U-plane 52. With every SDU from IPCS-u 20*b* through MAC-u SAP 42, the MAC 26 receives a TFID 22 and DiffServ at step 316, which the MAC 26 knows to uniquely associate to the LCID 38 and parameters configured by the RRC 18 in the C-plane 50 through the CMAC SAP 24. At step 317, the LCID 38 is present in the MAC 26 headers. Actually, different LCIDs 38 are present in the MAC 26 headers only if different LCIDs 38 exist in the same Transport Block. At step 318, the receiver MAC 26' converts back the SDU [LCID 38] into an SDU [TFID 22].

Described now, further in accordance with exemplary embodiments of this invention, are examples of an RRC 18 procedure for RLSP creation.

Figure 4:
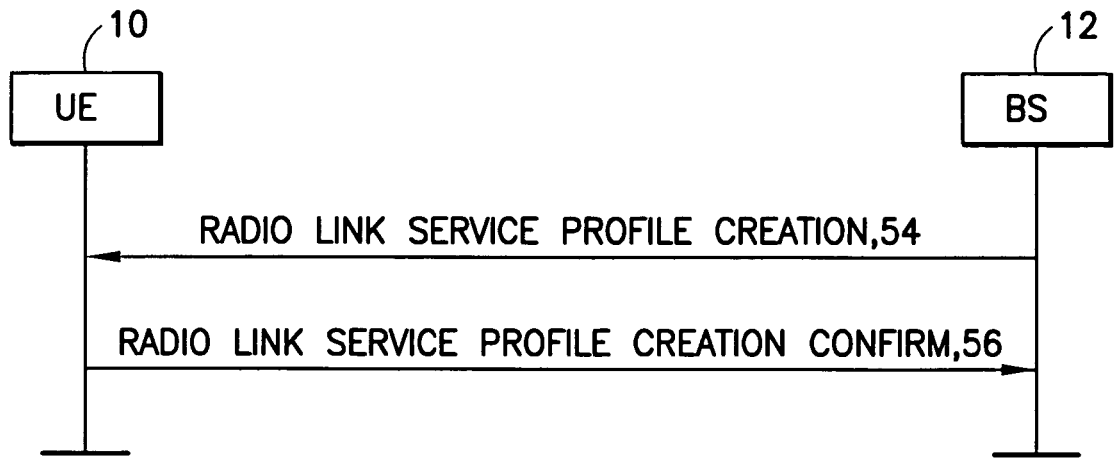
FIG. 4 illustrates a RRC procedure for radio link service profile creation when originated by the BS according to one exemplary embodiment.
Figure 5:
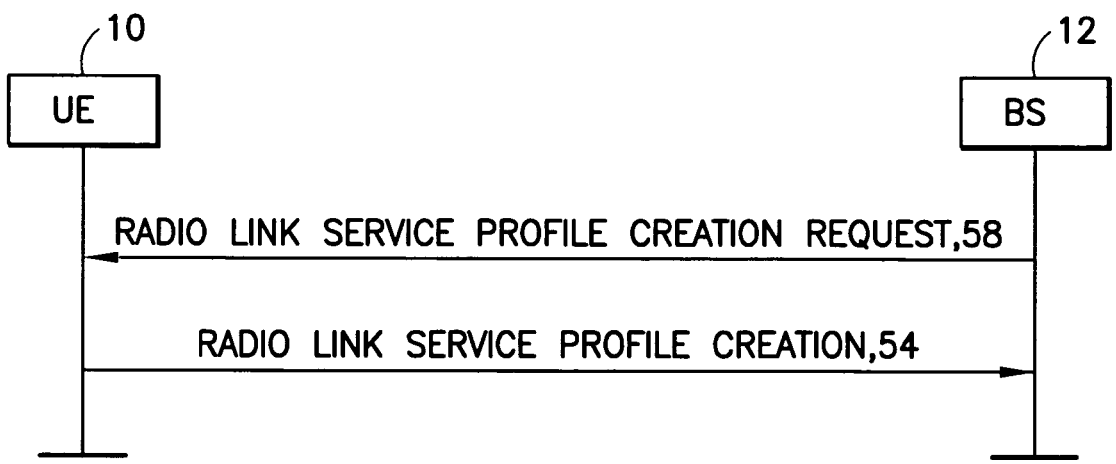
FIG. 5 illustrates a RRC procedure for radio link service profile creation when originated by the UE according to one exemplary embodiment.

The RRC 18 peer-to-peer signaling, when the radio link service creation is originated by the BS 12, includes RLSP CREATION 54 and RLSP CONFIRM 56 messages as shown FIG. 4. In the case where the radio link service creation is originated by the UE 10, the RRC signaling includes RLSP REQUEST 58 and RLSP CREATION 54 messages as shown in FIG. 5.

With regard now to examples of signaling in accordance with the exemplary embodiments of this invention, the RRC message, as well as the information elements containing the RLSP CREATION 54, are described and shown in FIG. 6. As can be seen, the RRC message whose elements are shown in FIG. 6 includes an identifier for the full service profile LLSID 62, TFID 22, Diffserv field 59, and LCID 38 as well as quality parameters delay 60a, rate 60b, BLER 60c, and error rate 60d. A transaction identifier 64 may identify the message for ready retrieval from storage in a memory when this RLSP is invoked after being created.

Figure 7A:
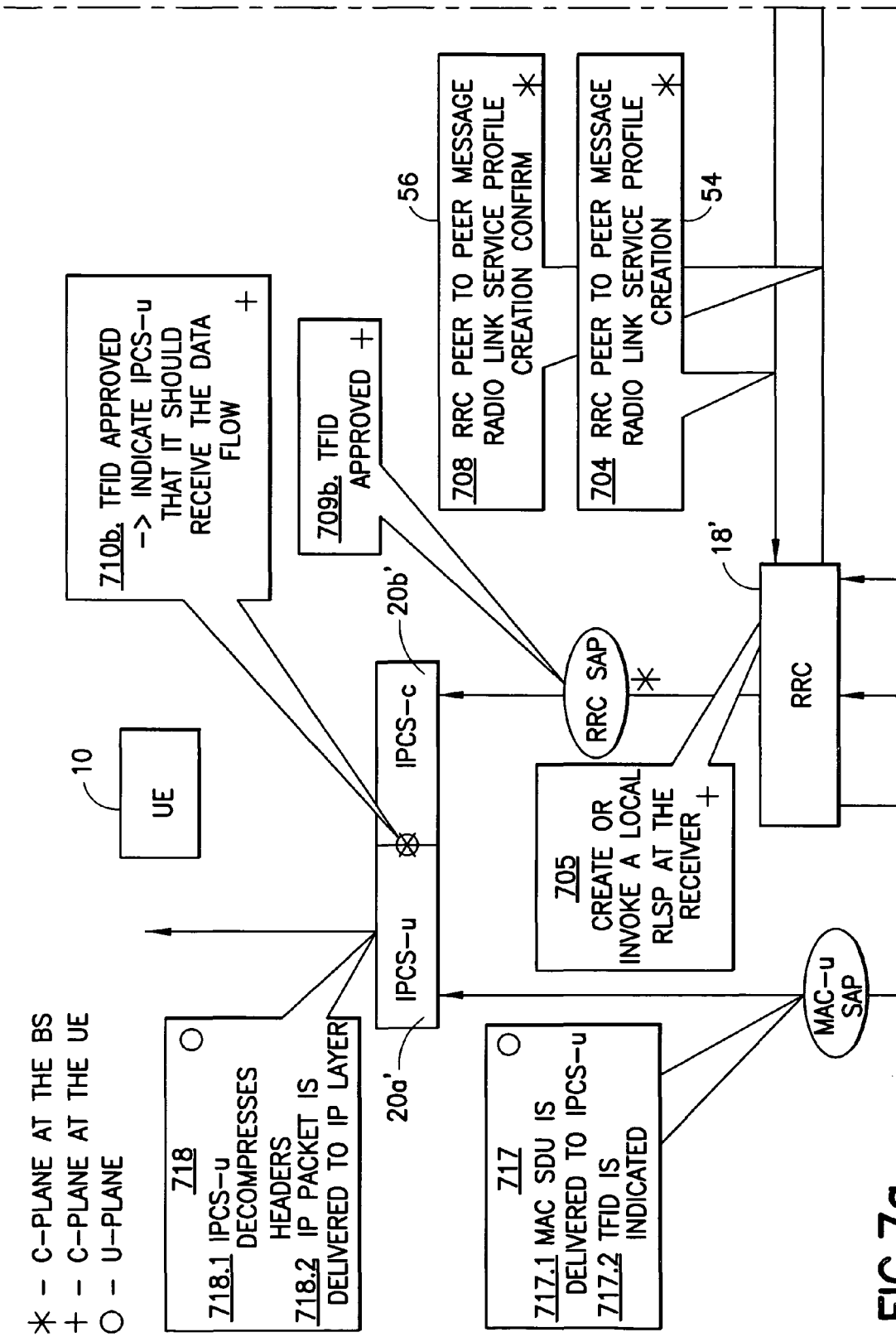
FIG. 7 shows an example of DL originated RLSP Creation according to one exemplary embodiment.
Figure 7B:
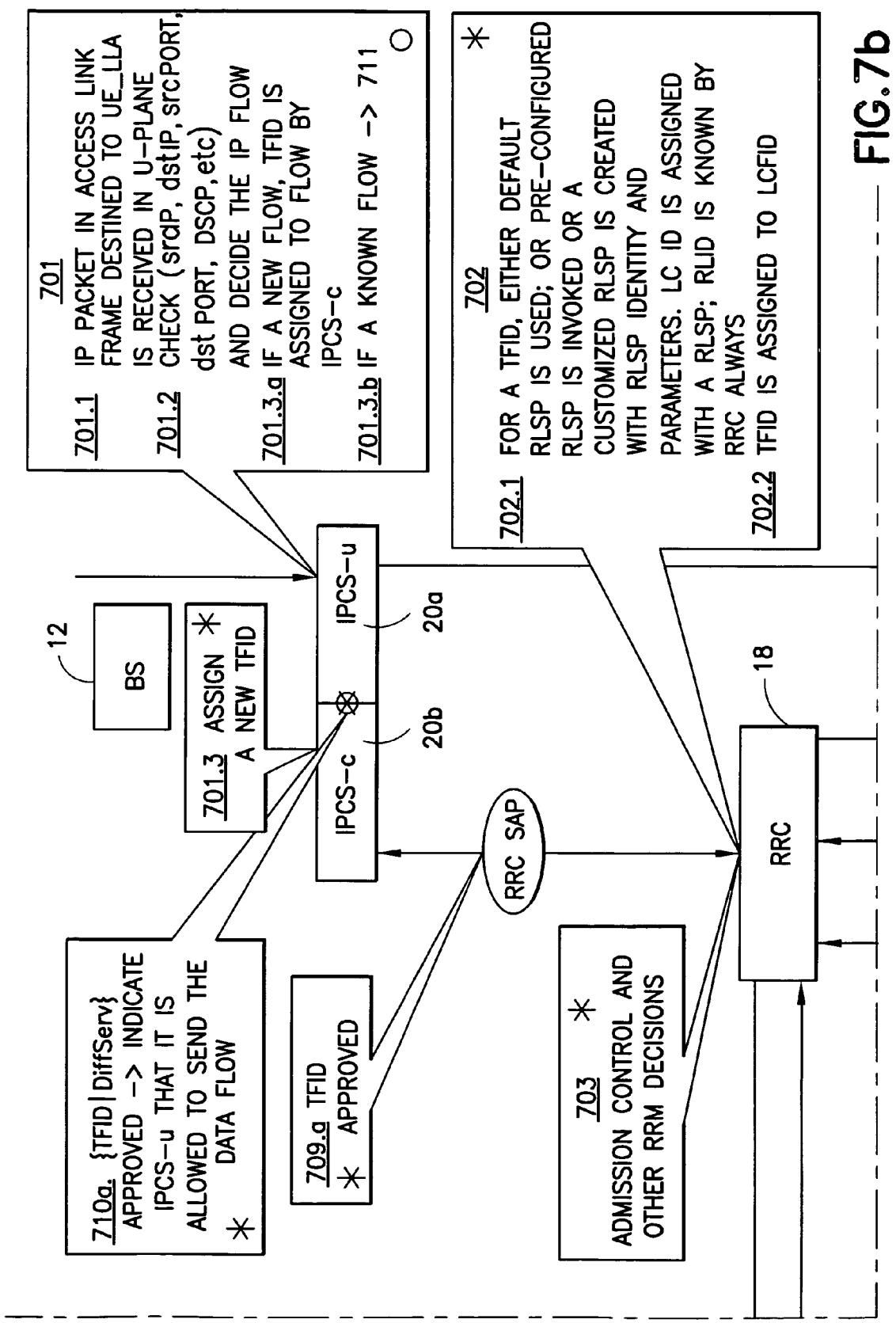
Figure 7C:
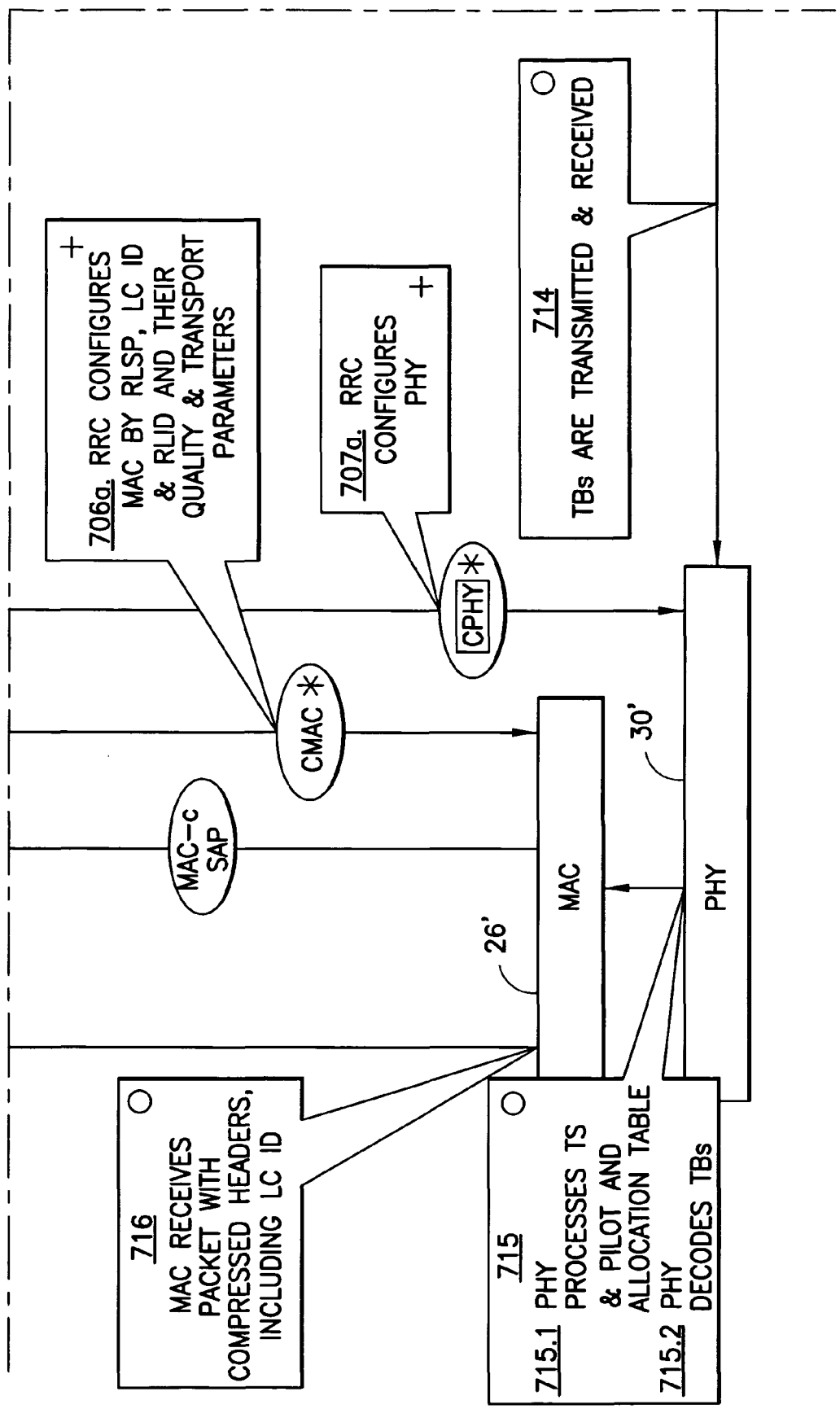
Figures 3, 8A:
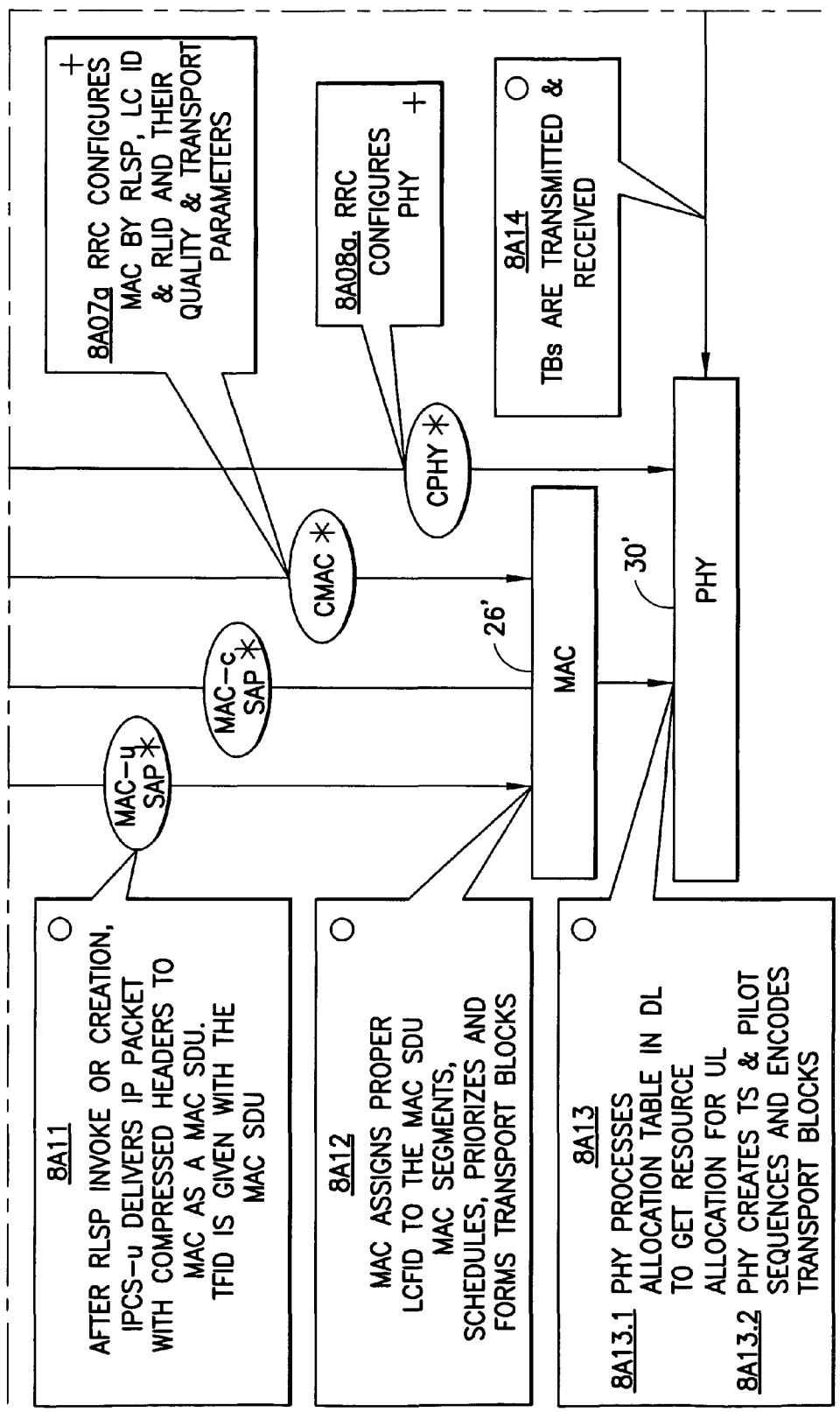
FIG. 8A shows an example of UL originated RLSP Creation according to one exemplary embodiment.
Figures 1, 8B:
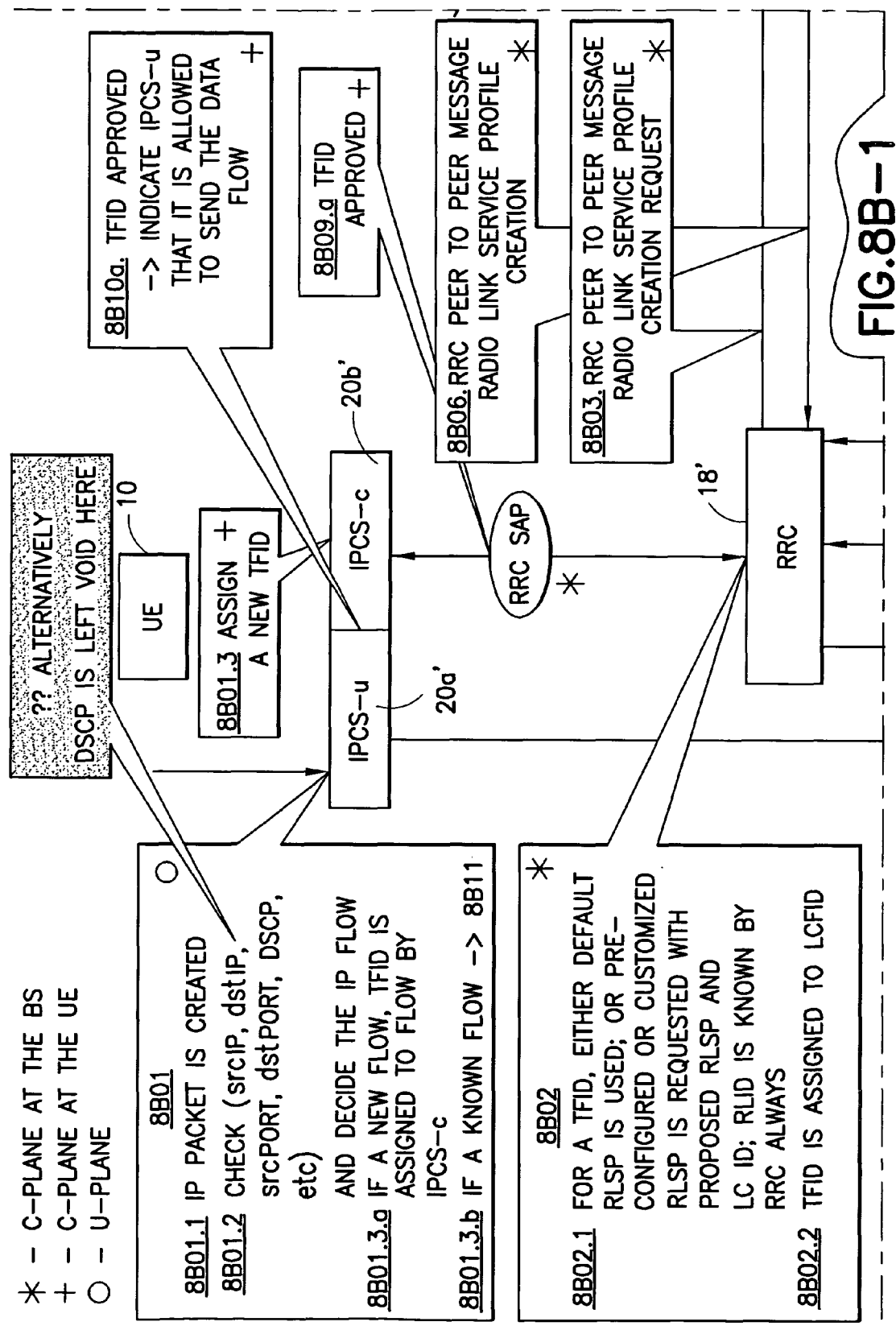
FIG. 8B shows an alternative embodiment of UL RLSP Creation according to one exemplary embodiment.
Figures 2, 8B:
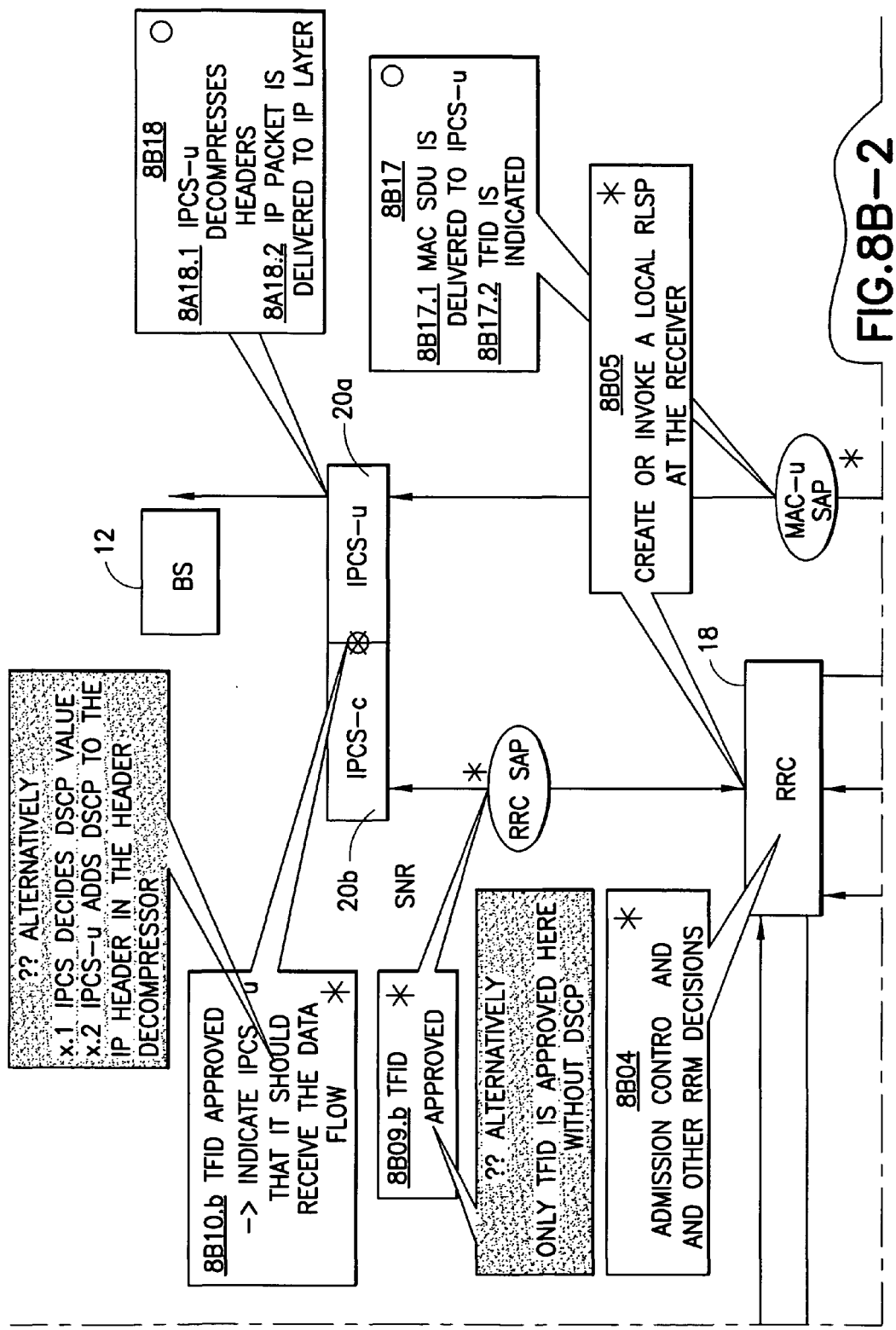
Figures 3, 8B:
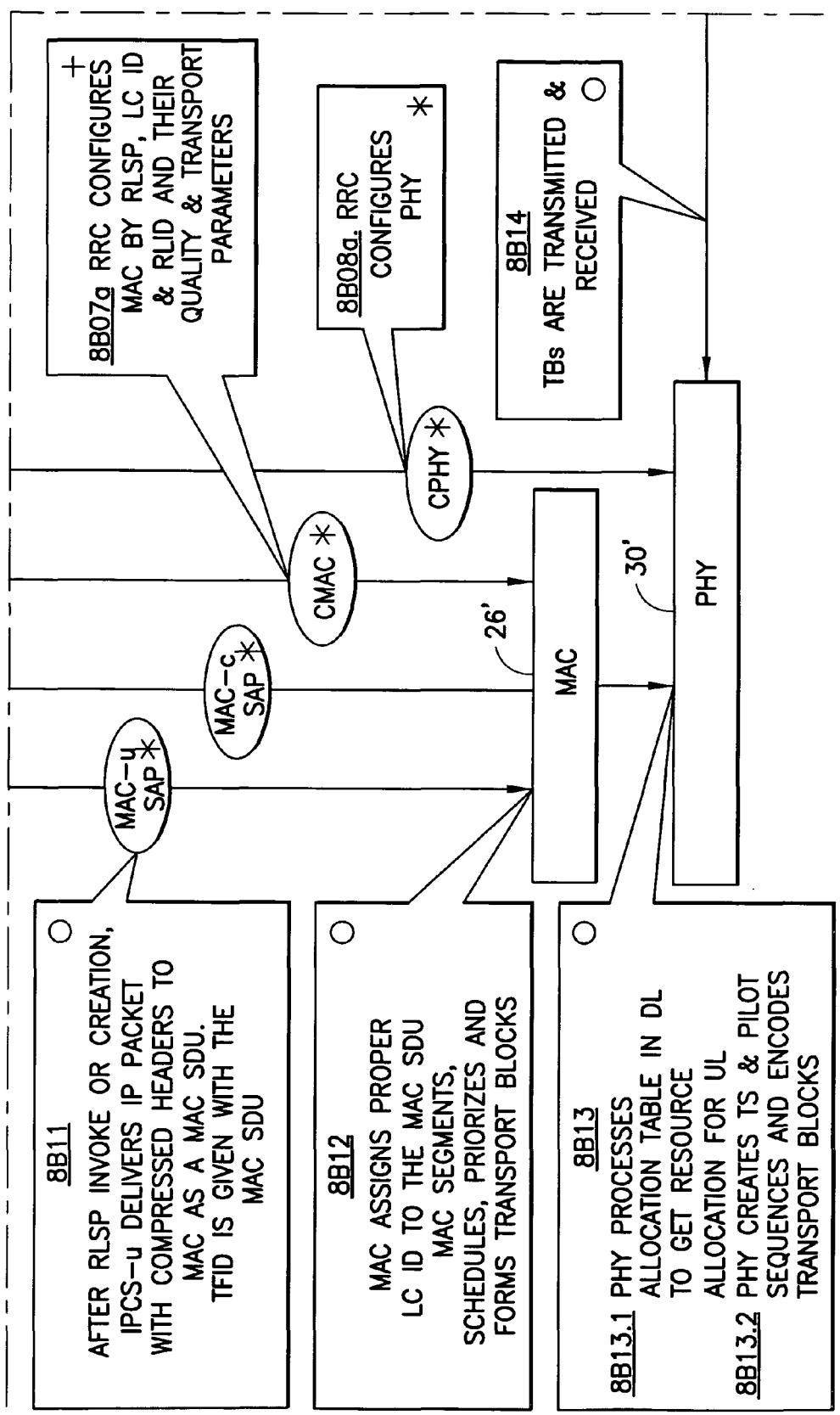
Figure 9:
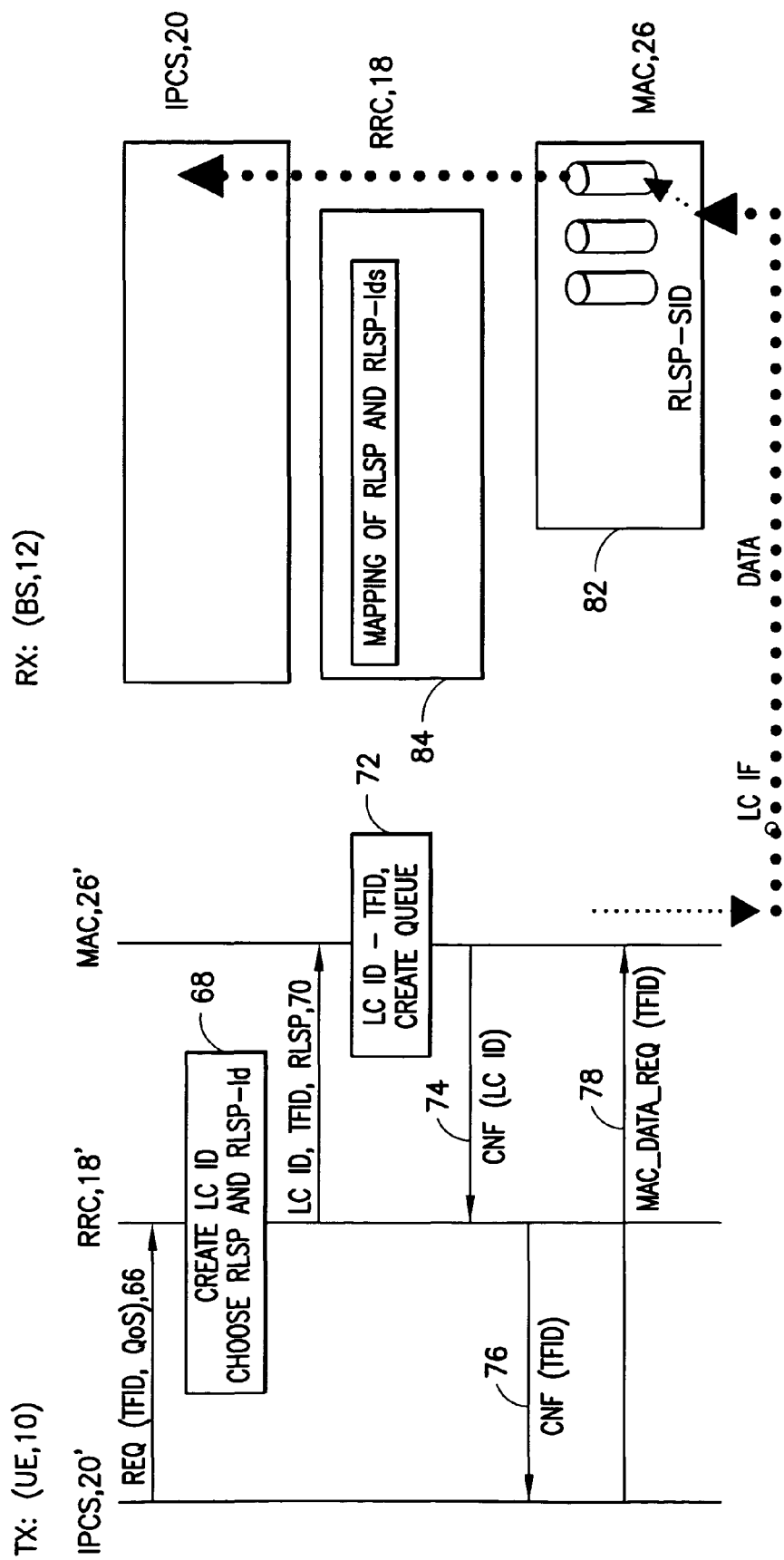
FIG. 9 illustrates an example of the use of a default RLSP or a pre-configured RLSP, according to one exemplary embodiment.

Reference may also be made to FIG. 7 for showing a non-limiting example of DL originated RLSP Creation, to FIG. 8A for showing a non-limiting example of UL originated RLSP Creation and/or invoking thereof; to FIG. 8B for showing another non-limiting example of UL RLSP Creation and/or invoking thereof, and to FIG. 9 for showing an example of the use of the above-described default RLSP or pre-configured RLSP. In FIGS. 7, 8A and 8B the numbered blocks define the general sequential order of operations and message flows. The legend shows those blocks indicated by a * as in the C-plane at the BS 12, those indicated by a + as in the C-plane at the UE 10, and those indicated by a 0 as in the U-plane.

Specifically, for RLSP creation and/or invoking thereof in the downlink as shown in FIG. 7, at step 701 several actions occur: 701.1 sees a packet in an access link frame destined to the UE 10 being received in the U-plane, where it is checked 701.2 (e.g., source and destination IP and port, diffserv, etc) to decide an IP flow, and at 701.3a if this is a new flow then a TFID 22 is assigned by IPCS-c 20b or if this is a known flow then at 701.3b the diagram is skipped to step 711. If this is a new flow at step 701.3a, then in the C-plane at the BS a new TFID 22 is assigned at step 701.3.

Assuming for the moment that this is a new flow, then at step 702 in the C-plane of the BS 12 it is determined at 702.1 whether a default, pre-configured, or new customized RLSP is to be used. The RLSP is assigned to a LCID 38 and the RLID is known already to the RRC. At step 711 the LCID 38 is matched to a TFID 22. Similar to that seen in FIG. 3A, then at step 703 admission control is performed, a RRC peer-to-peer RLSP is created at step 704, and a created or local RLSP is invoked at the receiver of the packet, the C-plane of the UE 10 at step 705. Steps 706a and b show the respective UE 10 and BS 12 configuring their MAC 26', 26 with the RLSP, LCID, and RLID as well as the quality parameters in that RLSP, and their PHY layers 30', 30 at steps 707a and b. The RLSP Creation Confirm message 56 is sent from the BS 12's RRC 18 to its peer 18' at the UE 10 at step 708, the TFID is approved on each side at steps 709a and b, and approval is indicated in the respective IPCS-u 20a, 20a' to send (from BS 12) and receive (at UE 10) the data flow on the TFID 22 at step 710a and b. Note that in other embodiments a given network implementation may omit the admission control of traffic flows or IP-packets, in which case the invention may still function without the signaling stages related to the admission control.

Step 711 now applies to both newly created RLSPs and those previously stored locally (e.g., pre-configured or default RLSPs) that are now invoked. There, the packet is delivered to MAC 26 as MAC-SDU, with which the TFID 22 is given in the U-plane where all further steps of FIG. 7 remain. The MAC 26 assigns the proper LCID 38 to the MAC SDU and forms transport blocks at step 712. The PHY 30 creates a transport sequence, pilot sequences and an allocation table at step 713.1 and then encodes the transport blocks at step 713.2. Those transport blocks are transmitted from the BS 12 to the UE 10 at step 714, where the PHY layer 30' of the UE 10 processes them in reverse at steps 715.1 and 715.2. The UE 10 MAC 26' receives the packets with headers, including the LCID at step 716, the MAC SDU is delivered to the IPCS-u 20a' at step 717.1 where the TFID is read at step 717.2, and the packet headers are decompressed at the UE 10's IPCS-u 20a' at step 718.1 so that the packet can be delivered to the IP layer at step 718.2.

As is evident from FIG. 7, there is not need to involve the RNC 14 in setting up the flow, so packets on that flow may be transferred directly to a routing node 16 without passing through the RNC 14. While the RNC 14 may be included in some of the signaling shown in certain embodiments as a coordination matter, such coordination is not generally necessary with the broader embodiments disclosed herein. The flow is set up with the diffserv field 59 (FIG. 6), so packets may be routed directly from the BS 12 to a routing node 16 on an IP network such as the Internet (Intranet or dedicated operator owned section of an IP net), and in reverse directly from the routing node 16 to the BS 12 for wireless transport to the destination UE 10.

FIG. 8A illustrates exemplary steps for creating/invoking RLSP in the uplink, and substantially mirrors the steps shown and described for FIG. 7 except that the packet is created in the UE 10 and sent to the BS 12 on the UL rather than the other way around for the DL of FIG. 7. Apart from the mirroring, differences between FIGS. 7 and 8A include the following. At step 8A03, the UE 10 sends to the BS 12 a RLSP creation request message 58, which is responded at step 8A06 with the RLSP creation message 54; there is no RLSP confirm message 56 as in FIG. 7. In other respects, FIG. 8A is a mirror image of FIG. 7.

FIG. 8B illustrates an embodiment for UL RLSP creation and/or invoking thereof that differs from FIG. 8a in the following respects, shown in FIG. 8B by bolded balloons, wherein the diffserv field (DSCP) is not indicated in the subject packet. At step 8B01.2, the source and destination IDs and ports may be present but there is no indication of diffserv. The TFID 22 may then be approved in the BS 12 without a diffserv specified at step 8B09b, and/or the TFID approval at step 8B10.b for the BS 12's IPCS-u 20a may decide a diffserv option (DSCP value) or add a DSCP to the header of the packet during decompression of that header. After that packet then, the decided or added DSCP will apply for the remainder of that flow, unless explicitly changed.

As will be appreciated, the bulk of FIGS. 7, 8A and 8B consider creating a new RLSP. FIG. 9 illustrates in a simpler view some of the same substance shown in FIGS. 7-8A, but without the creation of an RLSP and where a pre-configured or default RLSP that is already stored locally in the UE 10 and BS 12 is invoked for a flow. In FIG. 9, the UE 10 initiates the first packet for the flow to be established with the pre-existing RLSP. The UE 10's IPCS 20 (previously described as IPCS-c 20b' and IPCS-u 20a') requests of the UE 10's RRC 18' to establish quality parameters for a TFID 22 at 66, which the RRC 18' creates at 68 by choosing an appropriate (previously stored) RLSP and its identifier RLSP-id. The MAC layer 26' then associates the TFID 22 with a LCID 38 and confirms 74 to the RRC 18' with the LCID 38, which is then given 76 to the IPCS 20'. A packet (data) is sent 78 to the MAC layer 26', which sends it over the physical channel(s) 80 to the BS 12 using the TFID 22 and LCID 38 associated in the UE 10 with the chosen RLSP. The BS 12 MAC layer 26 receives the packet, looks up the RLSP it has stored in its memory 82 from its id given in the packet header, and sends the packet to its IPCS 20. The RRC 18 of the BS 12 is used to map 84 the RLSP-id in the header to the RLSP so that the quality parameters and diffserv code can be met for that packet as it is forwarded.

As was noted, there are three types of RLSPs. Default radio link service profiles may be specified in a standard for different logical channel types. Pre-configured RLSP are defined locally. Any number of pre-configured RLSPs may exist, but they all have a unique reserved RLSP identity. The pre-configuration can occur either in the subscription phase (e.g. SIM-based pre-configuration) or during the initial access. Alternatively, a few pre-configured RLSP profiles could be globally defined and written to the standard specifications, if considered practical. A specific RRC procedure is used to invoke a given pre-configured RLSP at the RRC peer entity.

The customized RLSP is defined locally at the originating entity (UE 10 or BS 12) and its creation is communicated with peer to peer RRC signalling as detailed above. The RADIO LINK SERVICE PROFILE CREATION message 54 contains full description of the parameters of the customized RLSP. It is possible in some embodiments to assign a single radio link service profile to more than one "IP traffic flows" consequently, i.e. a new assignment is invoked after the previous assignment is terminated. It is also possible to assign a single radio link service profile to more than one flow, for flows at different radio links (i.e. different UE 10 served by the BS 12).

If a suitable radio link service profile is available, it can be used by tagging the packets with the associated identifier. Otherwise a customized radio link service profile needs to be created by RRC layers as shown above. A number of radio link service profiles can be created to a UE at the same time. At creation, the RRC layer performs admission control and selects parameters for the radio link service profile (Layer 2), based on information from upper layers. RRC configures Layer 1 and MAC for the radio link service profile. Even when a customized radio link service profile needs to be configured for an IP flow, any packets belonging to that flow that arrive while the customized radio link service profile is created, a specific default/pre-configured radio link service profile can be tentatively used to determine the processing of the packets at radio link layer.

Figure 10B:
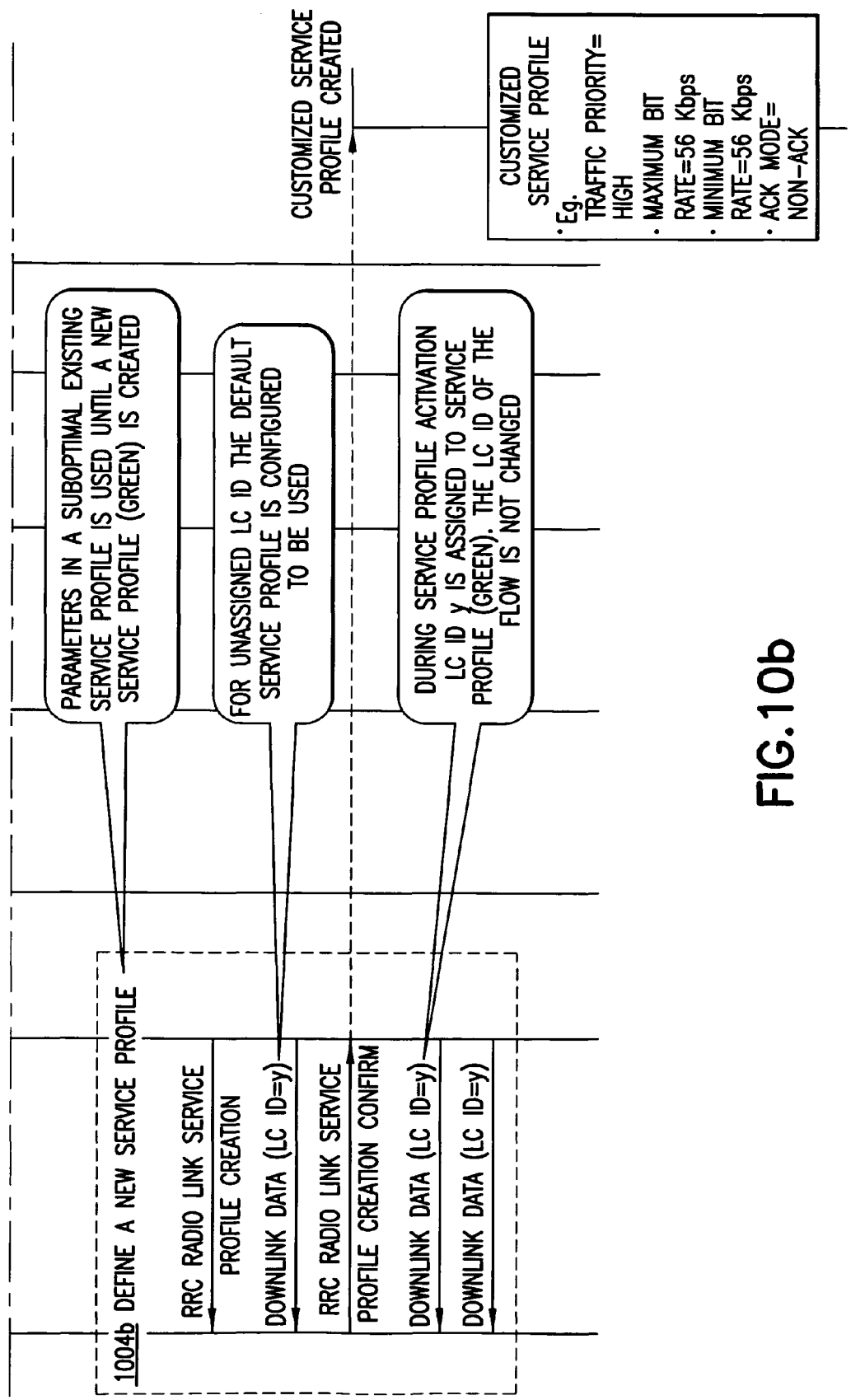
FIG. 10 illustrates an example of signaling for both a default and a customized radio link service profile for U-plane data transmission, according to one exemplary embodiment.

FIG. 10 illustrates another example of RLSP usage for U-plane data transmission. At step 1001, during application layer signaling the requested QoS for the service is indicated by Session Description Protocol parameters. Flow specific QoS parameters are transmitted to the BS 12 at step 1002, and at step 1003 the flow L2 QoS requirements are identified. After this, one of the two alternatives 1004a or 1004b takes place. If a suitable default (or pre-configured) radio link service profile exists, then at step 1004a the packets within the flow are transmitted together with the particular Logical Channel id (LCID 38) associated with the default/pre-configured RLSP. Most QoS parameters in the service profile are expected to be local to the transmitter, but the receiver can nevertheless identify the used RLSP based on the LCID 38. If no suitable service profile exists, a customized service profile is created at step 1004b through peer-to-peer signaling. An unassigned LCID 38 is reserved for the flow/RLSP already before the RADIO LINK SERVICE PROFILE CREATION procedure is initiated. Thus eventual incoming packets of the flow can be transmitted with this LCID 38 even though the customized service profile does not yet exist. One of the default RLSPs is permanently defined to be used to define the QoS whenever any unassigned LCID 38 is used for transmission. This allows undelayed transmission of early IP packets, although with the risk of applying non-optimal QoS parameters since the RLSP is default rather than custom for these early packets. Once the RADIO LINK SERVICE PROFILE CREATION procedure has been completed, the LCID 38 is assigned to the newly created RLSP and that is used to determine the QoS requirements of any subsequent transmissions.

In the service profile configuration, only the essential QoS parameters are transmitted over the air. As most of the QoS parameters are local to the transmitter those are not transmitted over the air for downlink flows. For uplink, the need to deliver the QoS parameters depends on the uplink scheduling and resource allocation algorithm and is FFS.

Figure 11:
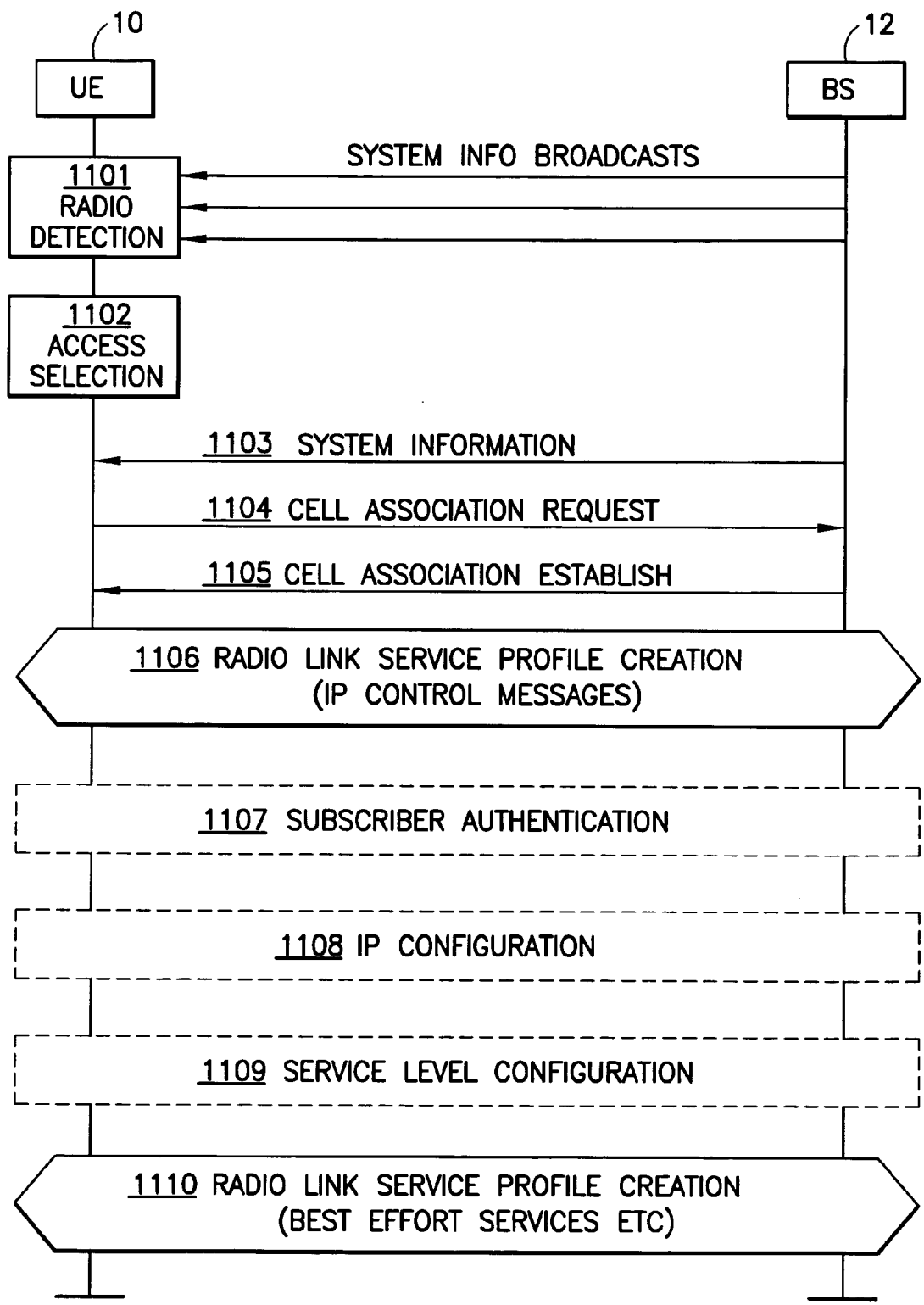
FIG. 11 illustrates a simplified signaling for initial access, according to one exemplary embodiment.

During the initial access, the UE needs to obtain link layer and IP layer connectivity to the network, be authenticated and obtain service configuration. To this aim the UE needs to perform functions as illustrated in FIG. 11.

After performing radio access detection 101 and radio access selection 1102, the UE 10 reads the complete system information 1103 and performs cell association procedure (request at 1104, establish at 1105) to obtain link layer connectivity to a specific BS 12. The related RRC messages are delivered with L1 and L2 configuration as determined by the default radio link service profile for initial RRC signalling. Thus there is no need for setup of an explicit signalling bearer. As a result of this procedure, the UE RRC state is switched to the active state. Any subsequent RRC signalling is delivered with a pre-configured radio link service profile defined for dedicated RRC signalling.

During the initial access, other procedures including higher layer signalling such as subscriber authentication, IP configuration and service level configuration may be taking place. This signalling can use either RRC direct-transfer type of delivery or it may be IP-based control messages. For IP control messages, a radio link service profile that meets their specific QoS requirements needs be created. This is done at step 1106. After subscriber authentication, IP configuration and service level configuration has been completed, there may be some radio link service profiles created with explicit RRC signalling to be used for delivering U-plane IP packets. Furthermore, customized radio link service profiles can be created at any later stage. This approach has the advantage over the UTRAN RRC connection approach in that there is no need to perform parameter negotiation to establish connectivity.

Advantages that are realized by the use of the exemplary embodiments of this invention are several, and include the provision of a simple technique to represent IP flows by local radio link radio parameters, the use of RLSP that can be quickly and simply created, assigned and invoked, and that can be readily modified without IP layer involvement. Further, the use of the RLSP eliminates the need for the conventional radio bearers, and the disadvantages inherent in the use of the radio bearers.

It should be appreciated that is a network architecture (e.g., GERAN/UTRAN) where IP traffic is conveyed with the presence of RNCs the invention may be split between the BS 12 and the RNC 14 processing nodes as shown in FIGS. 10 and 11. Here the notation of the IP traffic flows, the creation and assignment of the RLSP are done in the RNC 14. In this split the RRC protocol in the RNC 14 configures the MAC and PHY in the BS 12 (e.g. via a RANAP or NBAP protocol) by the created RLSP, or at least invokes a default or a predefined RLSP.

Based on the foregoing it should be apparent that the exemplary embodiments of this invention provide a method, apparatus and computer program product to uniquely assign an IP flow to a single Radio Link Service Profile, where if the IP flow is defined to support differentiated services, then each such differentiation of the IP flow is assigned to a unique logical channel flow of the assigned Radio Link Service Profile. The Radio Link Service Profile is defined for an upper layer flow and contains a unique profile identity per user equipment with a set of quality and transport parameters that are to be satisfied over MAC-u SAP peer entities. The use of the Radio Link Service Profile enables the elimination of radio bearers to convey IP traffic.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    associating a temporary interne protocol packet flow with a radio link service profile that comprises a set of quality parameters, a set of transport parameters and a logical channel identifier, said radio link service profile for upper layer packet transport; and
    one of sending or receiving a data packet, satisfying quality and transport requirements selected from the set of quality parameters and the set of transport parameters, over a wireless channel between a base station and a user equipment.

2. The method of claim 1, wherein the radio link service profile further comprises a diffserv field indicative of differentiated service flow.

3. The method of claim 1, wherein the radio link service profile is requested by the user equipment and confirmed by the base station, and wherein sending the data packet comprises sending the data packet from the user equipment to the base station or receiving the data packet comprises receiving the data packet from the user equipment by the base station.

4. The method of claim 3, wherein the requested radio link service profile is stored in a memory of the user equipment and in a memory of the base station prior to the temporary flow being established, the method further comprising invoking the stored radio link service profile by one of the base station or user equipment prior to the said sending or receiving the data packet.

5. The method of claim 1, wherein the radio link service profile is created by the base station and sent to the user equipment prior to the base station sending the data packet to the user equipment for the case of sending the data packet, or wherein the user equipment receives the data packet according to said radio link service profile from the base station for the case of receiving the data packet.

6. The method of claim 1, wherein the radio link service profile comprises a default radio link service profile comprising the set of quality parameters, wherein the set of quality parameters is stipulated in a specification applicable to packet transport over the wireless logical channel, said default radio link service profile stored in a memory of the user equipment and in a memory of the base station prior to the temporary flow being established.

7. The method of claim 1, wherein the radio link service profile further comprises the user equipment identifier unique to the user equipment from which the packet originates if the wireless logical channel is an uplink channel or to which the packet is destined if the wireless logical channel is a downlink channel.

8. The method of claim 1, wherein associating comprises a message exchange between the user equipment and the base station, and further wherein the message of the exchange derives from a message from a radio network controller.

9. The method of claim 1, wherein associating comprises a message exchange between the user equipment and the base station, and further wherein no message of the exchange derives from a message from a radio network controller but instead from a message from a base station or a routing node of the packet network.

10. The method of claim 1, wherein the temporary interne protocol packet flow is uniquely assigned to the radio link service profile, and for the case where there are multiple differentiated services within the packet flow, each said differentiated service of the packet flow is uniquely assigned one logical channel identifier of the radio link service profile.

11. An apparatus comprising a processor and a memory and a first transceiver, said memory storing computer program instructions to associate a temporary flow with a radio link service profile, said radio link service profile comprising a set of quality parameters, a set of transport parameters and a logical channel identifier for upper layer packet transport,
    wherein the first transceiver is configured to send a data packet to a second transceiver over a wireless channel after the computer program instructions make the association.

12. The apparatus of claim 11, wherein the radio link service profile further comprises a diffserv field indicative of differentiated service flow.

13. The apparatus of claim 11 comprising a user equipment, wherein the first transceiver apparatus sends a radio link service profile request message over a wireless link to a base station apparatus and receives a radio link service profile confirm message in reply.

14. The apparatus of claim 13, wherein the radio link service profile requested in the request message is stored in the memory of the apparatus prior to the temporary flow being established, and further wherein the computer program instructions invoke the stored radio link service profile prior to sending the data packet.

15. The apparatus of claim 11 comprising a base station, wherein the processor and computer program instructions create the radio link service profile and the first transceiver is configured to send the created radio link service profile to at least one user equipment prior to sending the data packet to the at least one user equipment.

16. The apparatus of claim 11, wherein the radio link service profile comprises a default radio link service profile comprising the set of quality parameters and the set of transport parameters, wherein the set of quality parameters and the set of transport parameters are stipulated in a specification applicable to packet transport over the wireless channel, said default radio link service profile stored in the memory of the apparatus prior to the temporary flow being established.

17. The apparatus of claim 16 comprising a base station.

18. The apparatus of claim 16 comprising a mobile station, as a user equipment.

19. The apparatus of claim 11, wherein the radio link service profile further comprises a user equipment identifier unique to a user equipment identified in the data packet as either a source or destination of the data packet.

20. The apparatus of claim 11, wherein associating comprises a wireless message exchange between the apparatus and another device, and further wherein the message of the exchange derives from a message from a radio network controller.

21. The apparatus of claim 11, wherein associating comprises a wireless message exchange between the apparatus and another device, and further wherein no message of the exchange derives from a message from a radio network controller but instead from a message from a base station or a routing node of the packet network.

22. The apparatus of claim 11, wherein the temporary flow is uniquely assigned to the radio link service profile, and for the case where there are multiple differentiated services within the temporary flow, each said differentiated service of the temporary flow is uniquely assigned one logical channel identifier of the radio link service profile.

23. A non-transient computer readable memory storing instructions which when executed cause a digital processor to perform actions directed toward stipulating upper layer transport conditions for a data packet, said actions comprising:
   associating a temporary flow with a radio link service profile that comprises a set of quality parameters, a set of transport parameters and a logical channel identifier, said radio link service profile for upper layer packet transport; and
   one of sending or receiving a data packet satisfying quality and transport requirements selected from the set of quality parameters and from the set of transport parameters over a wireless channel.

24. The non-transient computer readable memory of claim 23, wherein the radio link service profile further comprises a diffserv field indicative of differentiated service flow.

25. The non-transient computer readable memory of claim 23, wherein the storage medium is of the user equipment, the radio link service profile is requested by the user equipment and confirmed by the base station, for the case of sending the data packet is sent from the user equipment to the base station, or for the case of receiving the data packet is received from the user equipment by the base station.

26. The non-transient computer readable memory of claim 25, wherein the requested radio link service profile is stored in the memory of the user equipment prior to the temporary flow being established, the actions further comprising invoking the stored radio link service profile by one of the base station or user equipment prior to the said sending or receiving the data packet.

27. The non-transient computer readable memory of claim 23, wherein the storage medium is of the base station, the radio link service profile is created by the base station and sent to a the user equipment prior to the base station sending the data packet to the user equipment for the case of sending the data packet.

28. The non-transient computer readable memory of claim 23, wherein the radio link service profile comprises a default radio link service profile comprising the set of quality parameters and the set of transport parameters, wherein the set of quality parameters and the set of transport parameters are stipulated in a specification applicable to packet transport over the wireless channel, said default radio link service profile stored in the memory prior to the temporary flow being established.

29. The non-transient computer readable memory of claim 23, wherein the radio link service profile further comprises the user equipment identifier unique to the user equipment from which the data packet originates if the memory is of the user equipment or to which the packet is destined if the memory is of the base station.

30. The non-transient computer readable memory of claim 23, wherein associating comprises a message exchange between the user equipment and the base station, and further wherein the message of the exchange derives from a message from a radio network controller.

31. The non-transient computer readable memory of claim 23, wherein associating comprises a message exchange between the user equipment and the base station, and further wherein no message of the exchange derives from a message from a radio network controller but instead from a message from a base station or a routing node of the packet network.

32. The non-transient computer readable memory of claim 23, wherein the temporary flow is uniquely assigned to the radio link service profile, and for the case where there are multiple differentiated services within the temporary flow, each said differentiated service of the temporary flow is uniquely assigned one logical channel identifier of the radio link service profile.

33. A system comprising a base station and a user equipment, each of said base station and user equipment comprising a processor coupled to a transceiver and to a memory for storing computer program instructions, said system operating to coordinate upper layer signaling for a data packet by:
   exchanging messages between the base station and user equipment to associate a temporary flow with a radio link service profile that comprises a set of quality parameters, a set of transport parameters and a logical channel identifier, and then
   one of sending or receiving a data packet satisfying quality and transport requirements selected from the set of quality parameters and from the set of transport parameters over a wireless channel between the base station and the user equipment.

34. The system of claim 33, wherein the radio link service profile comprises a diffserv field indicative of differentiated service flow.

35. The system of claim 33, wherein the temporary flow is uniquely assigned to the radio link service profile, and for the case where there are multiple differentiated services within the temporary flow, each said differentiated service of the temporary flow is uniquely assigned one logical channel identifier of the radio link service profile.

36. An apparatus comprising a processor, a memory, and a receiver configured to receive a flow associated with a radio link service profile that comprises a set of quality parameters, a set of transport parameters and a logical channel identifier for upper layer packet transport, where the flow satisfying quality and transport requirements selected from the set of quality parameters and from the set of transport parameters is received over a wireless channel.

37. The apparatus of claim 36, wherein the logical channel comprises a wireless logical channel.

38. The apparatus of claim 37, wherein the apparatus comprises a base station.

39. The apparatus of claim 37 wherein the apparatus comprises a user equipment which further comprises a transmitter configured to send a radio link service profile request message over a wireless link to a base station and the receiver is configured to receive a radio link service profile confirm message in reply.

40. The apparatus of claim 37 wherein the apparatus comprises a base station, wherein the base station creates the radio link service profile and the apparatus further comprises a transmitter configured to send the created radio link service profile to at least one user equipment prior to sending the data packet to the at least one user equipment.

41. The apparatus of claim 36, wherein the radio link service profile further comprises a diffserv field indicative of differentiated service flow.

42. The apparatus of claim 36, wherein the radio link service profile comprises a default radio link service profile comprising the set of quality parameters and the set of transport parameters, wherein the set of quality parameters and the set of transport parameters are stipulated in a specification applicable to packet transport over the logical channel, said default radio link service profile stored in the memory prior to a temporary flow being established.

43. The apparatus of claim 36, wherein the flow comprises a temporary flow that is uniquely assigned to the radio link service profile, and for the case where there are multiple differentiated services within the temporary flow, each said differentiated service of the temporary flow is uniquely assigned one logical channel identifier of the radio link service profile.

* * * * *

UNITED STATES PATENT AND TRADEMARK OFFICE
CERTIFICATE OF CORRECTION

| | | |
|---|---|---|
| PATENT NO. | : 8,077,612 B2 | Page 1 of 1 |
| APPLICATION NO. | : 11/509502 | |
| DATED | : December 13, 2011 | |
| INVENTOR(S) | : Rinne et al. | |

It is certified that error appears in the above-identified patent and that said Letters Patent is hereby corrected as shown below:

Claim 1, col. 13, line 51 delete "interne" and insert --internet--.

Claim 10, col. 14, line 41 delete "interne" and insert --internet--.

Signed and Sealed this
Third Day of April, 2012

David J. Kappos
*Director of the United States Patent and Trademark Office*